United States Patent
Li

(10) Patent No.: US 10,574,070 B1
(45) Date of Patent: Feb. 25, 2020

(54) MULTI-FUNCTIONAL HUB INTEGRATED WITH AC POWER SUPPLY

(71) Applicant: SIMPower Technology Inc., Taipei (TW)

(72) Inventor: Dong-Sheng Li, Taipei (TW)

( * ) Notice: Subject to any disclaimer, the term of this patent is extended or adjusted under 35 U.S.C. 154(b) by 0 days.

(21) Appl. No.: 16/429,084

(22) Filed: Jun. 3, 2019

Related U.S. Application Data

(63) Continuation-in-part of application No. 16/252,582, filed on Jan. 19, 2019.

(51) Int. Cl.
*H02J 7/00* (2006.01)
*G06F 13/42* (2006.01)
(Continued)

(52) U.S. Cl.
CPC ............ *H02J 7/0052* (2013.01); *G06F 1/266* (2013.01); *G06F 13/4282* (2013.01);
(Continued)

(58) Field of Classification Search
None
See application file for complete search history.

(56) References Cited

U.S. PATENT DOCUMENTS

| | | | | |
|---|---|---|---|---|
| 6,147,682 | A * | 11/2000 | Kim | G06F 1/266 345/211 |
| 6,614,206 | B1 * | 9/2003 | Wong | G06F 1/1632 320/135 |

(Continued)

FOREIGN PATENT DOCUMENTS

| | | | | |
|---|---|---|---|---|
| CN | 102236374 A | * | 11/2011 | G06F 1/263 |
| CN | 202550224 U | * | 11/2012 | |

(Continued)

OTHER PUBLICATIONS

'USB Power Delivery Specification 1.0 Introduction,' Jul. 16, 2012. (Year: 2012).*

(Continued)

*Primary Examiner* — Steven G Snyder

(57) ABSTRACT

In order to achieve the aforesaid object and other objects, the hub of the present invention is electrically connected with an electronic device, an AC source, and at least one portable device which are located in the outside environment. The hub includes a first connector, at least one second connector, a third connector, a first switch member, a second switch member, a third switch member, a fourth switch member, a DC/DC converter and a control circuit. The first connector is electrically connected with the electronic device, the first connector is a USB-C. The second connector is electrically connected with the portable device. The third connector comprises an AC/DC converter, the third connector is electrically connected with the AC source via the AC/DC converter. The first switch member, one end of the first switch member is connected with the first connector. The second switch member, one end of the second switch member is connected with the first switch member, another end of the second switch member is connected with the second connector. The third switch member, one end of the third switch member is connected with the first connector, another end of the third switch member is connected with the AC/DC converter. The fourth switch member, one end of the fourth switch member is connected with the second connector, another end of the fourth switch member is connected with the third connector. The DC/DC converter, one end of the DC/DC converter is connected with the third connector, another end of the DC/DC converter is connected between the first switch member and second switch member. The control circuit is connected with the first switch member, the (Continued)

second switch member, the third switch member, the fourth switch member and the AC/DC converter. The control circuit is configured to control the first switch member, the second switch member, the third switch member, the fourth switch member and the AC/DC converter.

3 Claims, 19 Drawing Sheets

(51) Int. Cl.
G06F 1/26 (2006.01)
H01H 47/00 (2006.01)
H02J 7/02 (2016.01)
H01R 13/66 (2006.01)
H01R 27/02 (2006.01)

(52) U.S. Cl.
CPC ......... *H01H 47/00* (2013.01); *H01R 13/6675* (2013.01); *H01R 27/02* (2013.01); *H02J 7/022* (2013.01); *G06F 2213/0042* (2013.01); *H02J 2007/0059* (2013.01); *H02J 2007/0062* (2013.01)

(56) References Cited

U.S. PATENT DOCUMENTS

| | | | | |
|---|---|---|---|---|
| 7,460,889 | B2* | 12/2008 | Darshan | H04L 12/10 307/43 |
| 7,631,111 | B2* | 12/2009 | Monks | H04L 12/10 710/15 |
| 8,055,919 | B2* | 11/2011 | Magnusson | G06F 1/266 455/573 |
| 8,107,243 | B2* | 1/2012 | Guccione | G06F 1/26 330/285 |
| 8,237,414 | B1* | 8/2012 | Li | H02J 7/0003 320/103 |
| 8,312,199 | B2* | 11/2012 | Johnson | G06F 13/4022 710/16 |
| 8,794,997 | B2* | 8/2014 | Tin | H02J 1/00 439/535 |
| 8,799,537 | B1* | 8/2014 | Zhu | G06F 13/385 710/14 |
| 9,048,666 | B2* | 6/2015 | Su | H02J 7/0013 |
| 9,092,207 | B2* | 7/2015 | Zai | G06F 1/263 |
| 9,606,597 | B2* | 3/2017 | Chen | G06F 1/26 |
| 9,766,674 | B2* | 9/2017 | Dunstan | G06F 13/385 |
| 9,864,421 | B2* | 1/2018 | Li | G06F 1/26 |
| 9,997,939 | B2* | 6/2018 | Li | G06F 13/4022 |
| 10,001,799 | B2* | 6/2018 | Leinonen | G05F 3/02 |
| 10,127,181 | B2* | 11/2018 | Ghosh | G06F 13/4282 |
| 10,224,727 | B2* | 3/2019 | Li | H02J 7/0044 |
| 10,409,757 | B2* | 9/2019 | Li | G06F 13/4081 |
| 2005/0033996 | A1* | 2/2005 | Fong | G06F 1/266 713/300 |
| 2005/0080974 | A1* | 4/2005 | Lin | G06F 13/385 710/315 |
| 2009/0082910 | A1* | 3/2009 | Sato | G06F 1/263 700/297 |
| 2010/0060081 | A1* | 3/2010 | Cheong | H01R 13/6675 307/66 |
| 2010/0067197 | A1* | 3/2010 | Guccione | G06F 1/1632 361/728 |
| 2010/0205463 | A1* | 8/2010 | Magnusson | G06F 1/266 713/300 |
| 2011/0156483 | A1* | 6/2011 | Caraghiorghiopol | G06F 1/263 307/66 |
| 2012/0011376 | A1* | 1/2012 | Zai | G06F 1/263 713/300 |
| 2012/0203937 | A1* | 8/2012 | Mohanty | G06F 13/385 710/16 |
| 2012/0265911 | A1* | 10/2012 | Connolly | G06F 13/387 710/300 |
| 2012/0297207 | A1* | 11/2012 | Carlsen | G06F 13/4081 713/300 |
| 2013/0190059 | A1* | 7/2013 | Song | H02J 7/027 455/573 |
| 2013/0234668 | A1* | 9/2013 | Kuo | H02J 7/0052 320/125 |
| 2013/0267116 | A1* | 10/2013 | Tin | H02J 1/00 439/535 |
| 2013/0339769 | A1* | 12/2013 | Waters | G06F 1/266 713/310 |
| 2014/0208134 | A1* | 7/2014 | Waters | G06F 13/385 713/310 |
| 2014/0368159 | A1* | 12/2014 | Han | H02M 3/155 320/107 |
| 2015/0015184 | A1* | 1/2015 | Su | H02J 7/0013 320/107 |
| 2015/0042889 | A1* | 2/2015 | Wang | G06F 13/385 348/706 |
| 2015/0089092 | A1* | 3/2015 | Voto | G06F 13/4282 710/14 |
| 2015/0237567 | A1* | 8/2015 | Xue | H04W 48/16 455/552.1 |
| 2015/0256017 | A1* | 9/2015 | Hays | H02J 7/0054 320/103 |
| 2015/0268688 | A1* | 9/2015 | Leinonen | G06F 13/409 307/147 |
| 2015/0318728 | A1* | 11/2015 | Ghosh | G06F 13/4282 320/107 |
| 2015/0378409 | A1* | 12/2015 | Dunstan | G06F 13/385 713/310 |
| 2016/0139640 | A1* | 5/2016 | Hijazi | G06F 1/26 361/679.31 |
| 2016/0163480 | A1* | 6/2016 | Lester | G06F 13/00 713/300 |
| 2016/0202743 | A1* | 7/2016 | Li | G06F 1/26 |
| 2016/0277235 | A1* | 9/2016 | Bhesania | H04L 41/0803 |
| 2016/0371213 | A1* | 12/2016 | Voto | G06F 13/4022 |
| 2017/0005494 | A1* | 1/2017 | Li | H02J 7/0044 |
| 2017/0192466 | A1* | 7/2017 | Paul | A63F 13/98 |
| 2017/0293335 | A1* | 10/2017 | Dunstan | G06F 1/266 |
| 2018/0026469 | A1* | 1/2018 | Kamath | H02J 7/025 320/106 |
| 2018/0097385 | A1* | 4/2018 | Li | G06F 13/4022 |
| 2018/0143934 | A1* | 5/2018 | Li | H04L 12/10 |
| 2018/0358821 | A1* | 12/2018 | Li | H02J 7/0027 |

FOREIGN PATENT DOCUMENTS

| | | | | |
|---|---|---|---|---|
| CN | 203324980 U | * | 12/2013 | |
| CN | 103744815 A | * | 4/2014 | ............ G06F 1/26 |
| CN | 106654742 A | * | 5/2017 | |
| CN | 206195402 U | * | 5/2017 | |
| JP | 2000010671 A | * | 1/2000 | |
| JP | 2017016659 A | * | 1/2017 | ............ H02J 7/0044 |
| TW | 201331744 A1 | * | 8/2013 | |

OTHER PUBLICATIONS

'Qualcomm's Quick Charge 2.0 technology explained' by Robert Triggs, November 6, 2014. (Year: 2014).*
'Quick, Rapid, Turbo, And Fast Charging Explained: What You Need To Know About Charging Your Smartphone' by David Ruddock, Jun. 12, 2015. (Year: 2015).*
'Qualcomm Quick Charge 1.0: Less Time Charging, More Time Doing' by PJ Jacobowitz, Feb. 14, 2013. (Year: 2013).*
'ISP1261—USB OTG bridge controller' by Philips, Aug. 2004. (Year: 2004).*

* cited by examiner

MULTI-FUNCTIONAL HUB INTEGRATED WITH AC POWER SUPPLY

BACKGROUND OF THE INVENTION

1. Field of the Invention

The present invention relates to a hub, and more particularly to a hub having a compound power source and capable of transmitting data and charging.

2. Description of the Prior Art

These days, with the development of technology, the size of various portable devices (such as cell phones) becomes smaller and smaller, so that the portable devices can be carried conveniently. In general, the portable devices rely on a battery to maintain a normal operation. When the battery runs out, the portable device needs to be charged immediately.

Nowadays, the portable devices can be charged with an adapter (or a charger) in cooperation with the mains (AC power supply). Consumers may use the USB of a personal computer for charging. However, The USB of a personal computer or a notebook computer usually provides only a standard charging mode of 500 mA. There are various portable devices on the market. A person may own at least two portable devices, such as a cell phone, an external hard disk, a tablet computer, a digital camera, and the like. Sometimes, the number of the USB ports of a desktop computer is not enough for use. The user may purchase a USB hub so as to increase the number of USB ports. In particular, for a compact notebook computer to be carried conveniently, the number of the USB ports will be reduced accordingly. The compact notebook computer may provide only two USB ports, and it may provide only one USB port in the future. When the user goes out, he/she has to carry not only the required cell phone, notebook computer, and hub but also the corresponding adapters. This is very inconvenient for use. At present, there are some electronic products for a quick charge (such as, a car charger or a charger having a plurality of USB ports). Although these products have enough power for a plurality of portable electronic devices to be charged quickly, they are unable to transmit data. A traditional USB hub is able to increase the number of USB ports for data transmission among a plurality of portable devices, but the USB ports of a normal apparatus provide a limited power source. In order to avoid the overcurrent of the USB port or because of the lack of a quick charge and a signal transmission function (such as, CDP mode), the portable devices are allowed to be charged in a standard mode. The hub is unable to provide a quick charge function. Few hubs on the market are provided with an additional adapter to provide more power sources. However, the user has to take at least two adapters along. This increases cost and inconvenience. Some of the USB hubs are switched manually for switching a USB power source and an external power source, which is quite inconvenient for use.

Therefore, how to solve the above problems and develop a hub which is capable of transmitting data and charging in a quick manner and can be carried conveniently and is cost-effective is worth to be considered for a person skilled in this field. Accordingly, the inventor of the present invention has devoted himself based on his many years of practical experiences to solve these problems.

SUMMARY OF THE INVENTION

The primary object of the present invention is to provide a hub capable of transmitting data and charging. The hub can be carried conveniently and charged anytime and anywhere.

In order to achieve the aforesaid object and other objects, the hub of the present invention is electrically connected with an electronic device, an AC source, and at least one portable device which are located in the outside environment. The hub includes a first connector, at least one second connector, a third connector, a first switch member, a second switch member, a third switch member, a fourth switch member, a DC/DC converter and a control circuit. The first connector is electrically connected with the electronic device, the first connector is a USB-C port. The second connector is electrically connected with the portable device. The third connector comprises an AC/DC converter, and the third connector is electrically connected with the AC source via the AC/DC converter. One end of the first switch member is connected with the first connector, one end of the second switch member is connected with the first switch member, and another end of the second switch member is connected with the second connector. One end of the third switch member is connected with the first connector, and another end of the third switch member is connected with the AC/DC converter. One end of the fourth switch member is connected with the second connector, and another end of the fourth switch member is connected with the third connector. One end of the DC/DC converter is connected with the third connector, and another end of the DC/DC converter is connected between the first switch member and second switch member. The control circuit is connected with the first switch member, the second switch member, the third switch member, the fourth switch member and the AC/DC converter. The control circuit is configured to control the first switch member, the second switch member, the third switch member, the fourth switch member and the AC/DC converter.

DETAILED DESCRIPTION OF THE INVENTION

Embodiments of the present invention will now be described, by way of example only, with reference to the accompanying drawings, in which like reference numbers refer to like elements throughout.

Figure 1A:
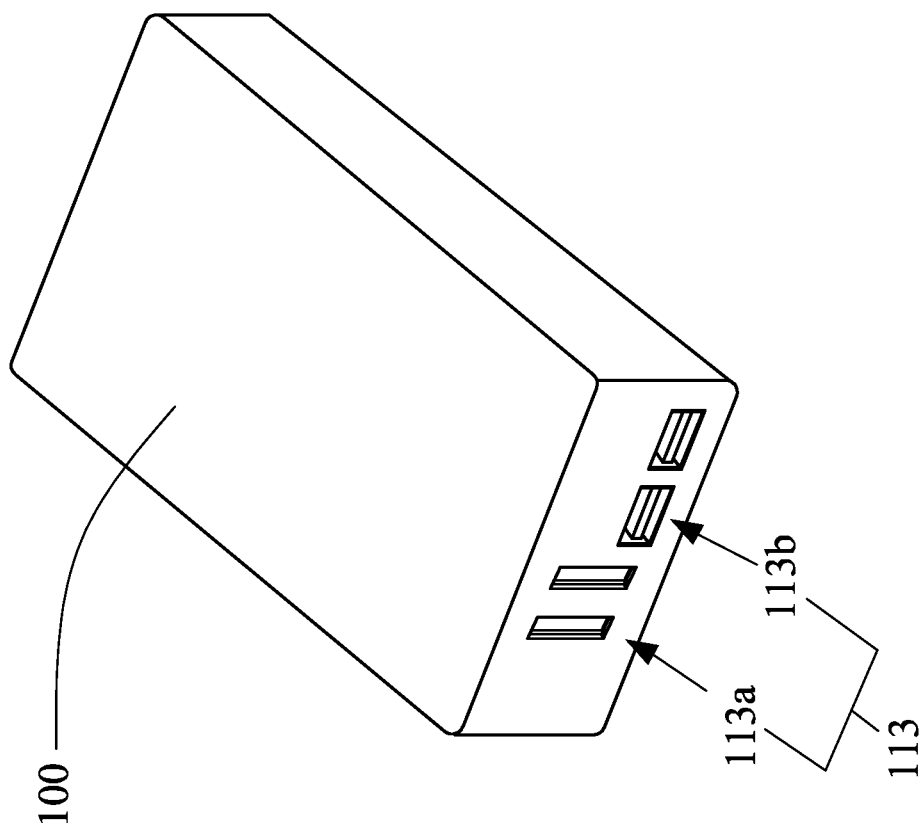
FIG. 1A and FIG. 1B are perspective views of the hub in accordance with a first embodiment of the present invention.
Figure 1B:
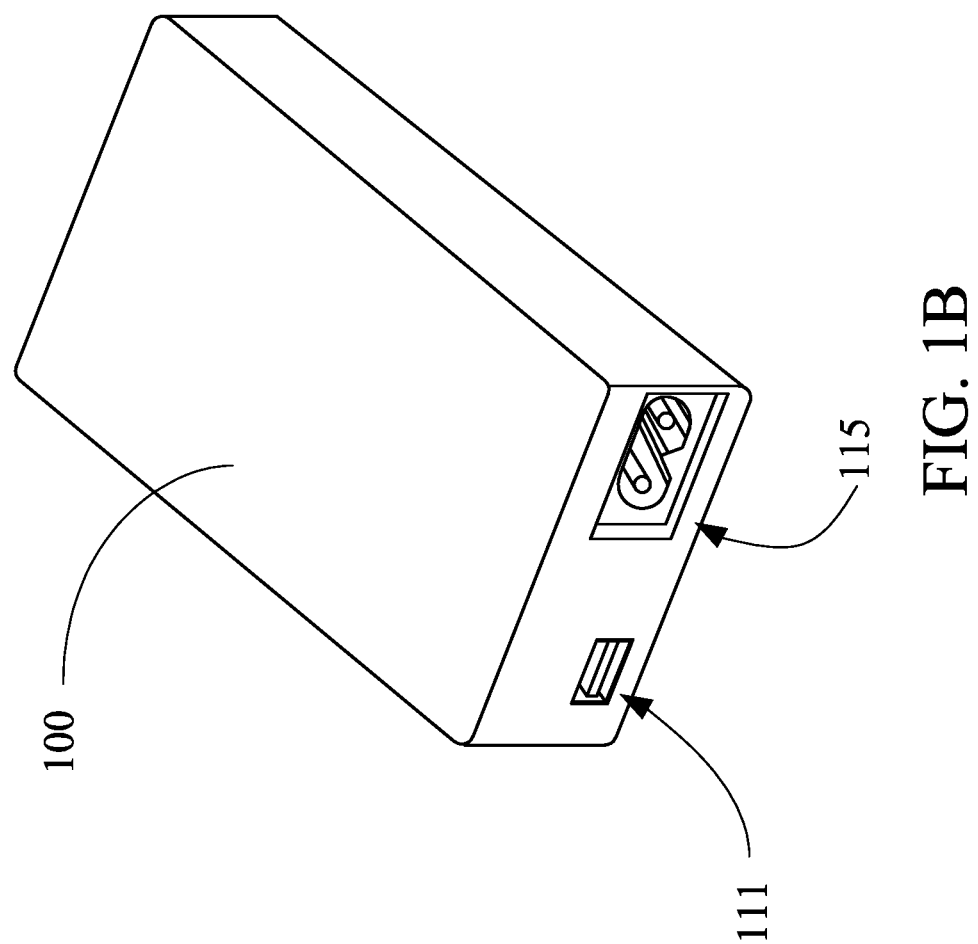
Figure 2A:
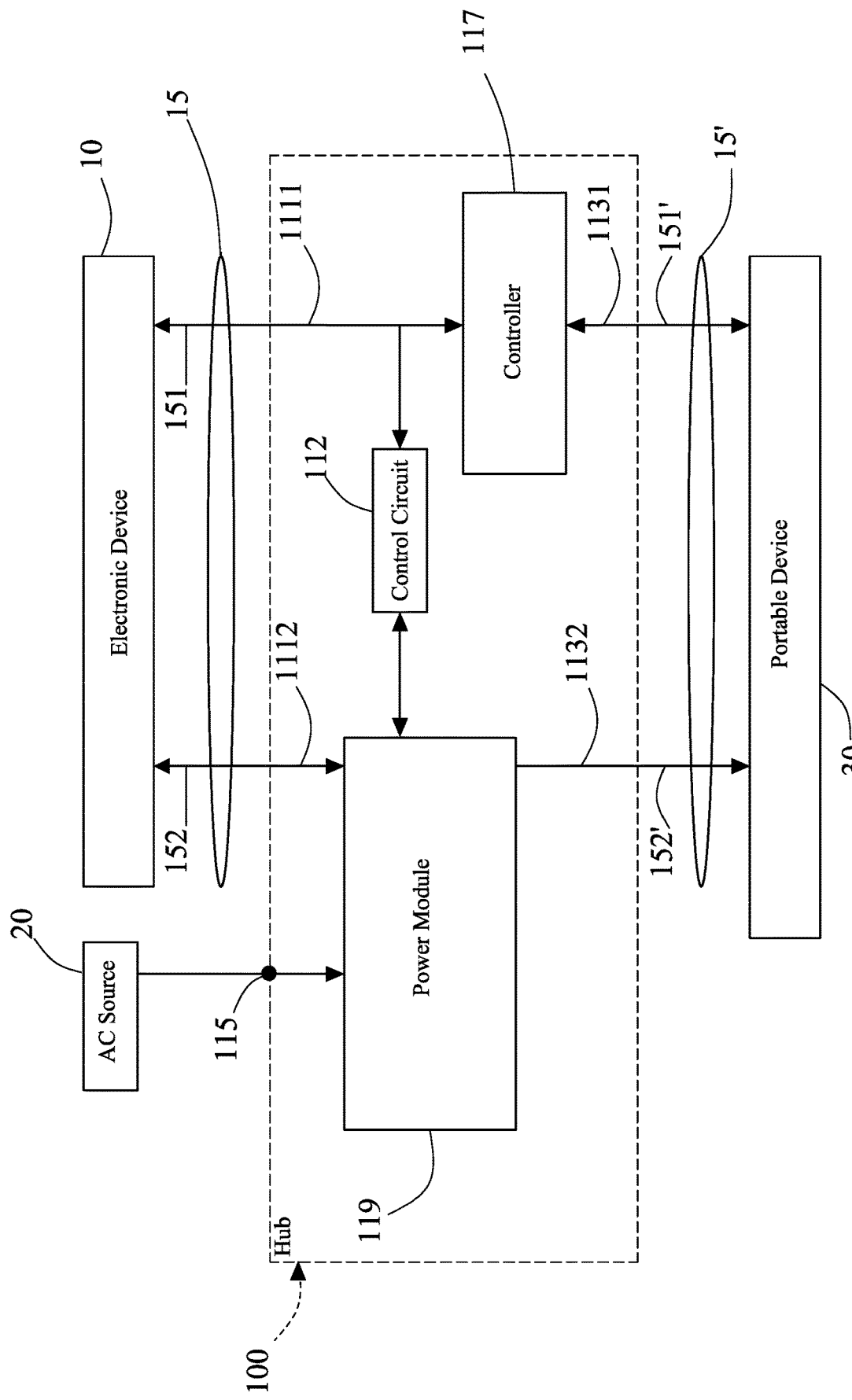
FIG. 2A is a schematic view of the framework of the hub in accordance with the first embodiment of the present invention.
Figure 9A:
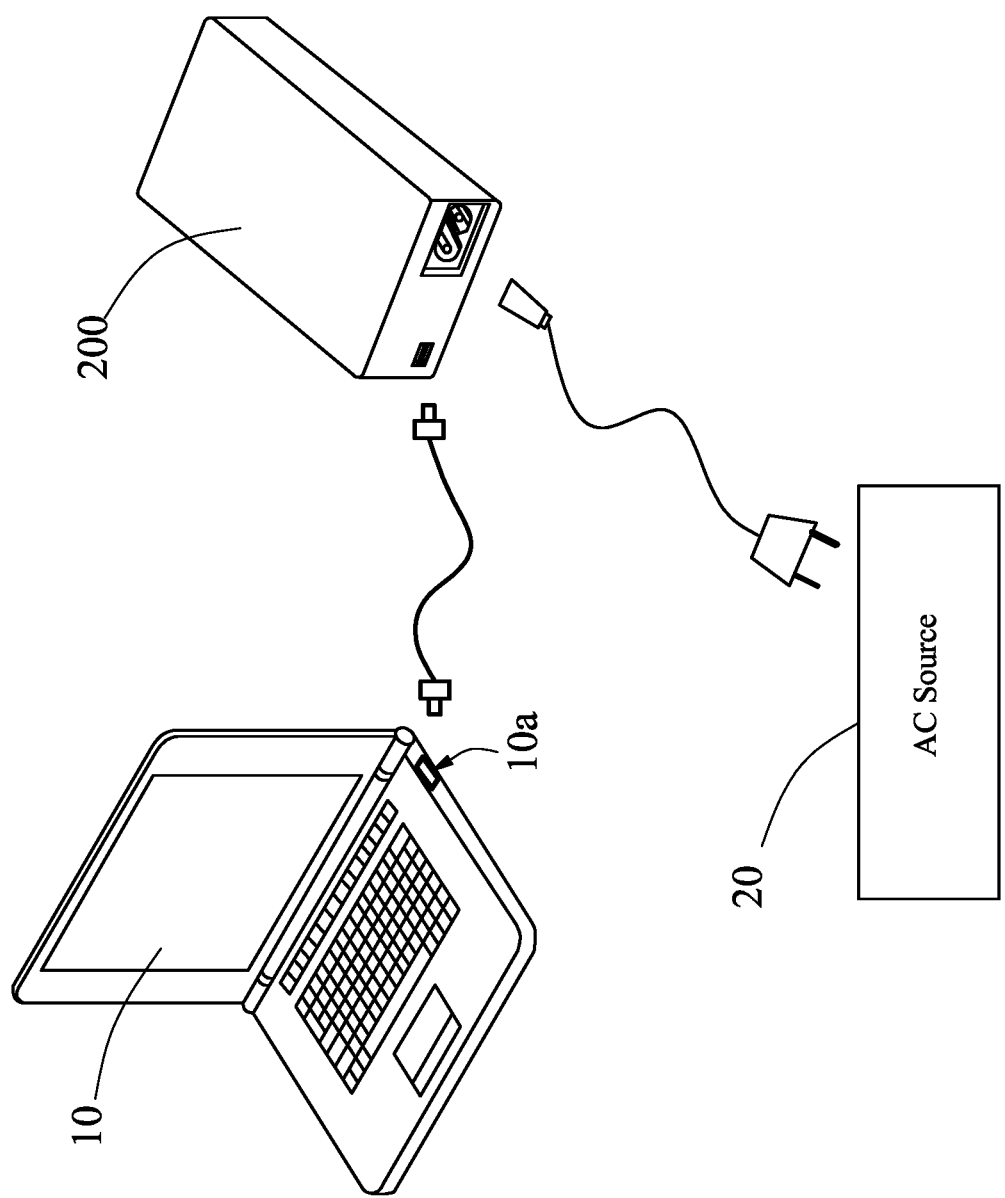
FIG. 9A and FIG. 9B are schematic views of the hub of the present invention when in use.

Please refer to FIG. 1A, FIG. 1B, and FIG. 2A. FIG. 1A and FIG. 1B are perspective views of a hub in accordance with a first embodiment of the present invention. FIG. 2A is a schematic view of the framework of the hub in accordance with the first embodiment of the present invention. A hub 100 includes a first connector 111 and at least one second connector 113. In this embodiment, the hub 100 includes four second connectors 113. Wherein, two of the four second connectors 113 are USB Type-A interfaces, and the other two of the four second connectors 113 are USB Type-C interfaces. Besides, the number and the form of the first connector 111 and the second connector 113 are not limited thereto. The hub 100 is electrically connected with a USB port 10a (as shown in FIG. 9A) of an electronic device 10 through the first connector 111 and a USB transmission line 15. For example, the USB port 10a is a USB interface, and the electronic device 10 is an AIO (All in one) PC, a desktop computer, or a notebook computer. Each second connector 113 enables the hub 100 to be electrically connected with a portable device 30. For example, the portable device 30 is a cell phone, a tablet computer, a card reader, a storage device, and the like. The electronic device 10 is electrically connected with the portable device 30 through the USB transmission line 15 and the hub 100 for interchanging data or charging. Furthermore, the hub 100 further includes a controller 117 therein. The controller 117 is electrically connected between the electronic device 10 and the portable device 30. In addition, the first connector 111 includes a first data transmission line 1111 and a first power line 1112. The second connector 113 includes a second data transmission line 1131 and a second power line 1132. In this embodiment, a signal transmission line 151 of the USB transmission line 15 is connected to the controller 117 through the first data transmission line 1111. The controller 117 is connected to the portable device 30 through the second data transmission line 1131 and a signal transmission line 151' of another USB transmission line 15'. The controller 117 and the portable device 30 transmit signals to each other for establishing a data transmission communication between the electronic device 10 and the portable device 30.

The controller 117 is able to send a signal to the portable device 30. The portable device 30 will start a quick charge mode after receiving the signal. In detail, the existing USB ports have three charging definitions, SDP, DCP and CDP. SDP is mainly used for data transmission. Its charging current is only standard 500 mA, so the charging rate is slower. DCP is mainly used for charging. Its maximum charging current is 1500 mA or more. But, it cannot be used for data transmission. CDP can be used for data transmission. Its maximum charging current is 1500 mA. The signal sent by the controller 117 enables the portable device 30 to start the quick charge mode for supporting CDP, such that quick charging and data transmission can be performed simultaneously. Besides, the controller 117 may also allow the portable device 30 to start the DCP mode only according to the demand. For example, if the hub 100 is connected to a voltage source (such as, a power bank or an indoor mains) without a data transmission function, instead of connecting to the USB port 10a of the electronic device 10, the controller 117 enables the portable device 30 to start the DCP mode.

As shown in FIG. 1A, FIG. 1B, and FIG. 2A, the hub 100 further includes a third connector 115 and a power module 119. The third connector 115 is electrically connected with an external AC source 20. The power module 119 is electrically connected with the first connector 111, the second connector 113, and the third connector 115. The power module 119 is adapted to supply the power outputted from the AC source 20 or the electronic device 10 to the portable device 30. In an embodiment, when the third connector 115 is not connected with the AC source 20 and the first connector 111 is electrically connected with the electronic device 10, the electronic device 10 will supply power to the portable device 30 through the power module 119. When the third connector 115 is connected with the AC source 20, the AC source 20 will supply power to the portable device 30 through the power module 119. In another embodiment, when the third connector 115 is connected with the AC source 20, the AC source 20 and the electronic device 10 will simultaneously supply power to the portable device 30.

Furthermore, in a preferable embodiment, the hub further includes a control circuit 112. The control circuit 112 is electrically connected between the first data transmission line 1111 and the power module 119. If the USB port 10a of the electronic device 10 supports a power supply mode and a charging mode, for example, the USB port 10a is a USB Type-C interface, the USB port 10a of the electronic device 10 can be switched to a power supply mode or a charging mode through the communication among the control circuit 112, the power module 119, and the electronic device 10. In detail, when the third connector 115 is not electrically connected with the AC source 20, the USB port 10a of the electronic device 10 is in the power supply mode so that the control circuit 112 and the controller 117 can operate and the control circuit 112 communicates with the power module 119. The control circuit 112 can inform the electronic device 10 of the present state of the power module 119 all the time. When the power module 119 is electrically connected with the AC source 20, the control circuit 112 will instruct the electronic device 10 to stop the power supply mode. After that, the control circuit 112 instructs the power module 119 to adjust and output voltage to the first connector 111, and then instructs the electronic device 10 to actuate the internal switch (not shown) for switching the USB port 10a to the charging mode. When the power module 119 is not electrically connected with the AC source 20, the control circuit 112 will instruct the electronic device 10 to stop the charging mode of the USB port 10a. After that, the control circuit 112 instructs the power module 119 to interrupt the power supply of the first connector 111, and then instructs the electronic device 10 to actuate the internal switch (not shown) for switching the USB port 10a to the power supply mode.

Figure 2B:
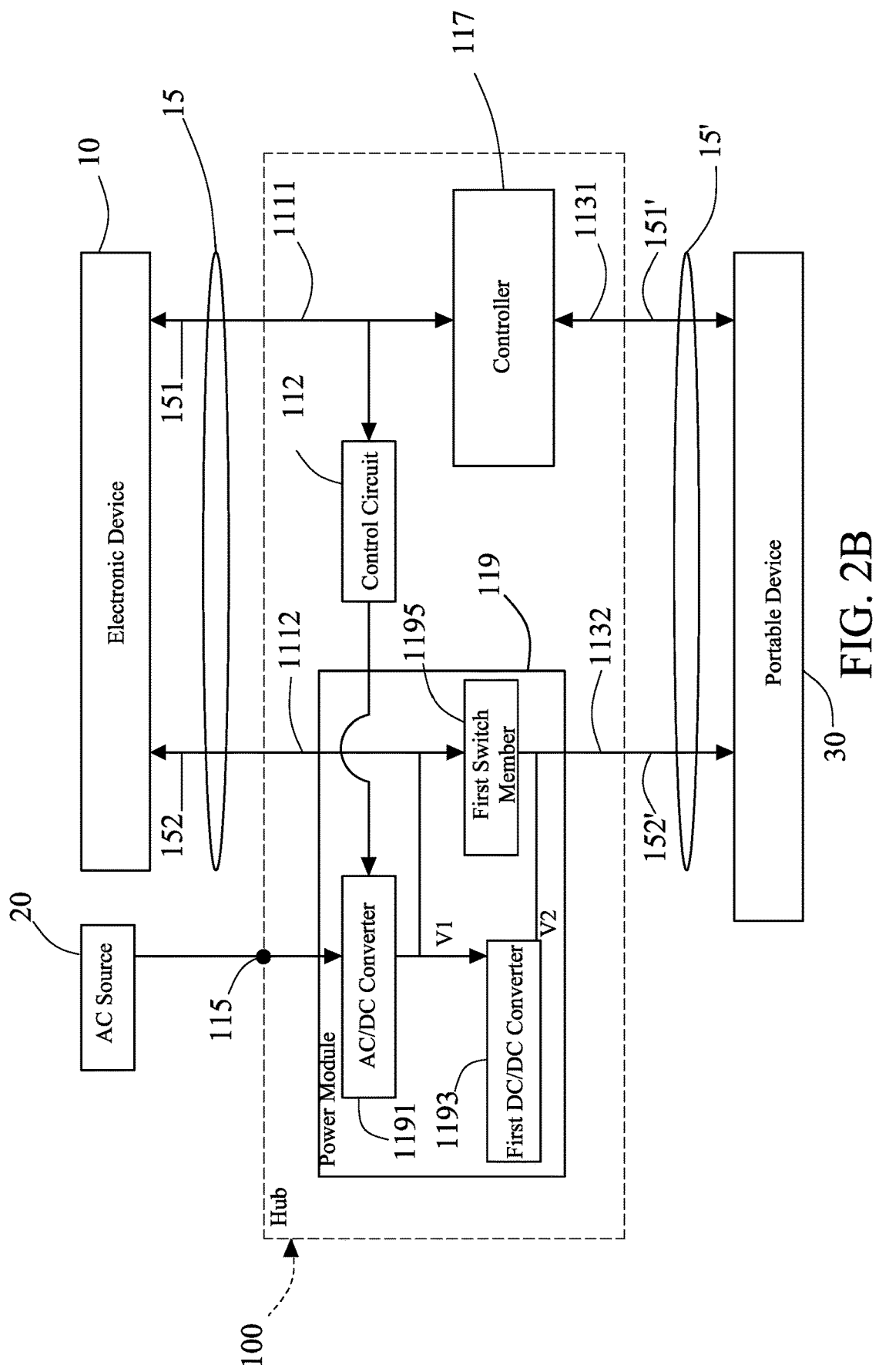
FIG. 2B is a schematic view of the framework of the hub in accordance with a second embodiment of the present invention.

Next, please refer to FIG. 1A, FIG. 1B, and FIG. 2B. FIG. 2B is a schematic view of the framework of the hub in accordance with a second embodiment of the present invention. In this embodiment, the power module 119 includes an AC/DC converter 1191, a first DC/DC converter 1193, and a first switch member 1195. An input end of the AC/DC converter 1191 is electrically connected with the AC source 20 through the third connector 115. Another input end of the AC/DC converter 1191 is electrically connected with the control circuit 112. The control circuit 112 can adjust the output voltage V1 of the AC/DC converter 1191. The voltage V1 may be 5V, 9V, 12V, 15V, 20V and so on, or the other voltage values. Besides, an input end of the first DC/DC converter 1193 is electrically connected with the AC/DC converter 1191, and an output end of the first DC/DC converter 1193 is electrically connected with the portable device 30. The first switch member 1195 is electrically connected between the first power line 1112 of the first connector 111 and the second power line 1132 of the second connector 113.

The power module 119 may be provided with a detecting circuit (not shown in the drawings) to detect whether it has been electrically connected with the AC source 20 or not. When the detecting circuit detects that the third connector 115 is electrically connected with the AC source 20, the first switch member 1195 will be opened (not electrically conducted), such that the first power line 1112 and the second power line 1132 are not electrically connected and the USB port 10a of the electronic device 10 is switched to the charging mode. In this embodiment, the output voltage of the AC source 20 may be in the range of 100 VAC-240 VAC. The output voltage V1 of the AC/DC converter 1191 is adjusted by the control circuit 112. For example, the control circuit 112 can be informed the required voltage of the electronic device 10 is 20V via the first data transmission line 1111 and adjust the output voltage V1 of the AC/DC converter 1191 to be 20V for supplying power to the electronic device 10. Besides, the output voltage V2 of the first DC/DC converter 1193 may be 5V for supplying power to the portable device 30.

When the third connector 115 is not electrically connected with the AC source 20, the first switch member 1195 will be closed (namely, in a conduction state), such that the USB port 10a of the electronic device 10 is switched to the power supply mode, as a result, the first power line 1112 and the second power line 1132 are electrically connected so that the electronic device 10 supplies power to the portable device 30.

Figure 3A:
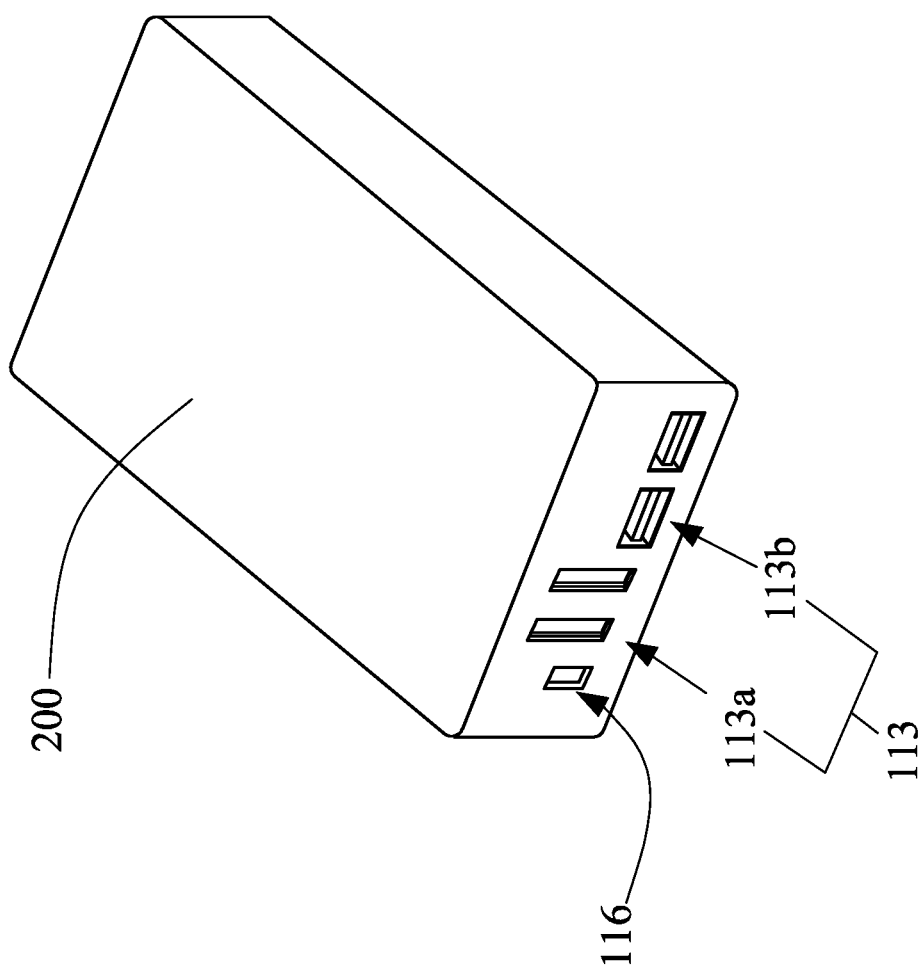
FIG. 3A and FIG. 3B are perspective views of the hub in accordance with a third embodiment of the present invention.
Figure 3B:
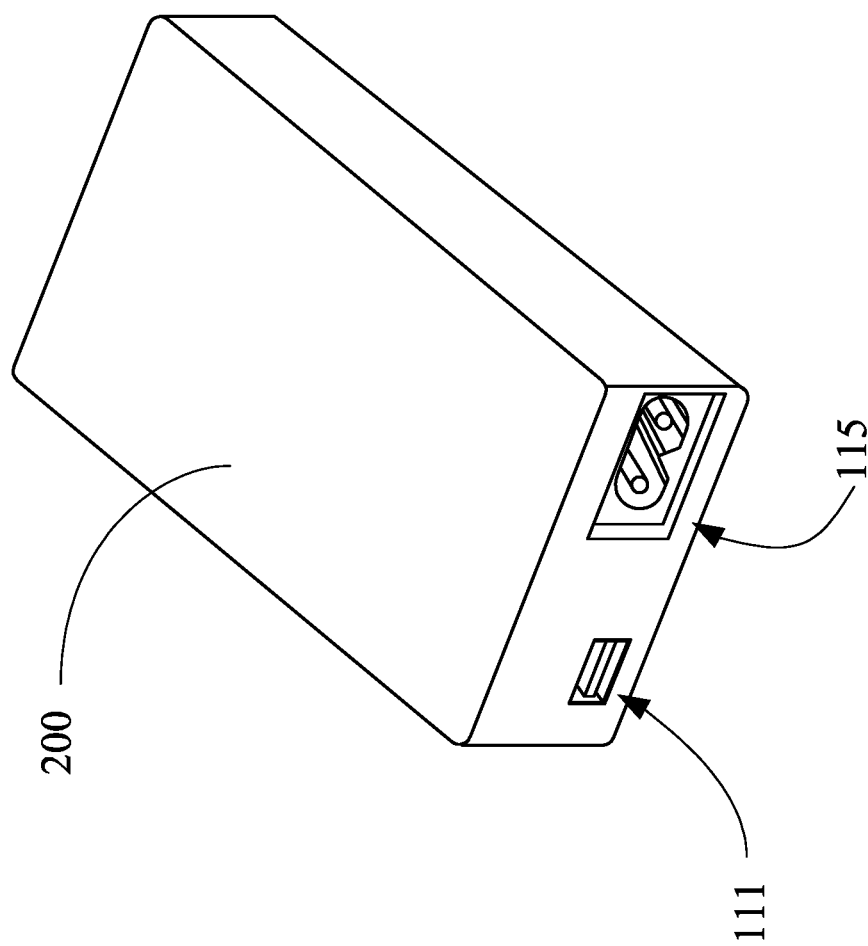
Figure 4A:
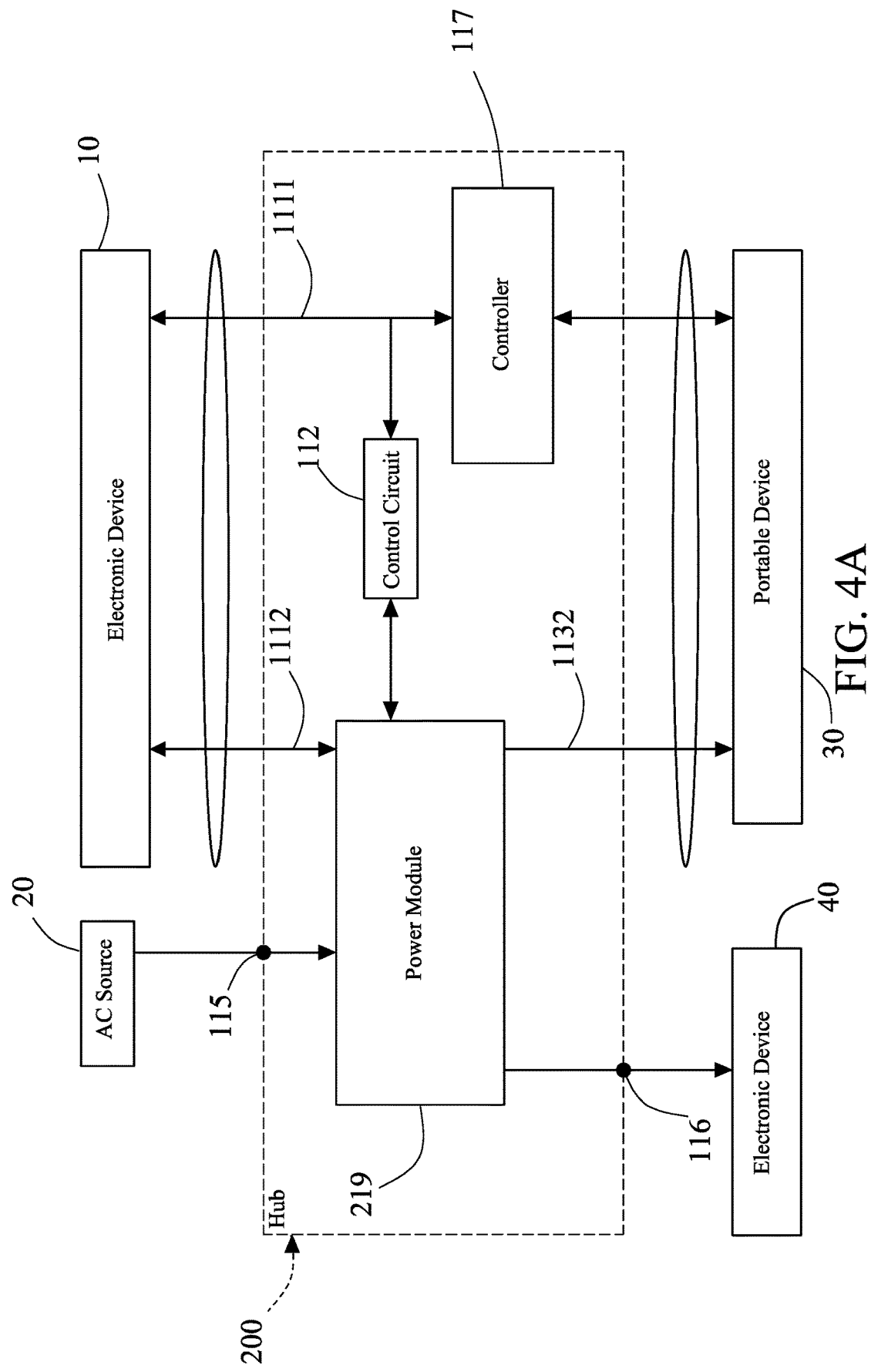
FIG. 4A and FIG. 4B are schematic views of the framework of the hub in accordance with the third embodiment of the present invention.

Please refer to FIG. 3A, FIG. 3B, and FIG. 4A. FIG. 3A and FIG. 3B are perspective views of the hub in accordance with a third embodiment of the present invention. FIG. 4A is a schematic view of the framework of the hub in accordance with the third embodiment of the present invention. Compared to the hub 100 of the first embodiment, the hub 200 of this embodiment further comprises a fourth connector 116. The fourth connector 116 is electrically connected with another electronic device 40 which is located in the outside environment. The fourth connector 116 in the hub 200 is electrically connected with the power module 219. The fourth connector 116 is electrically connected with the electronic device 40. The power module 219 supplies the power outputted from the AC source 20 to the electronic device 40. The required input voltage of the electronic device 40 is different from that of the portable device 30.

Figure 4B:
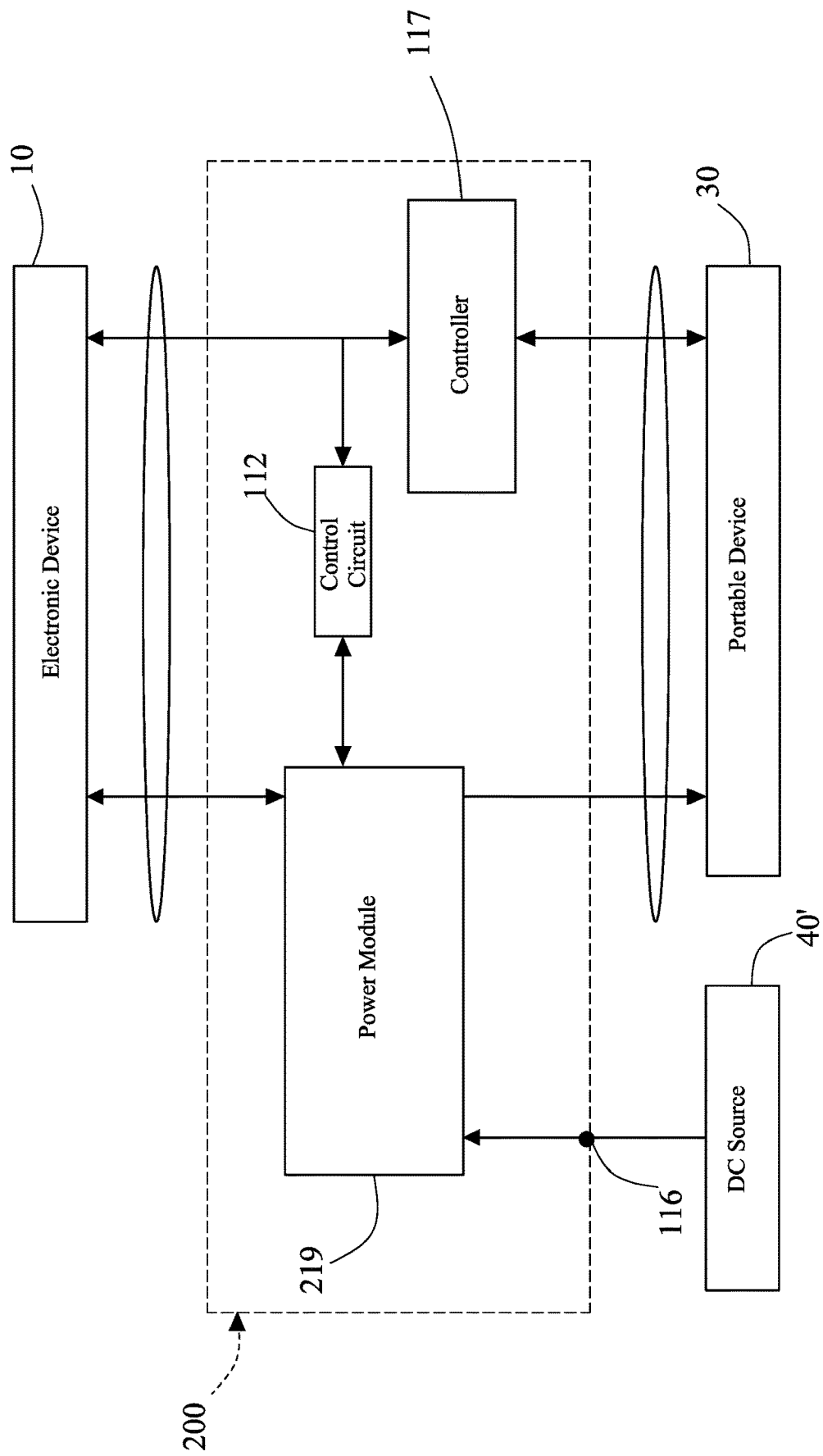

The electronic device 40 may be a tablet computer, a notebook computer, or an AIO (All in one) PC. Referring to FIG. 4B, when the fourth connector 116 is electrically connected with a DC source 40' and the third connector 115 is not electrically connected with the AC source 20, the power module 219 supplies the power outputted from the DC source 40' to the electronic device 10 or the portable device 20. The DC source 40' may be a charging stand of a car battery, and its output voltage is 12V or 24V.

Figure 4C:
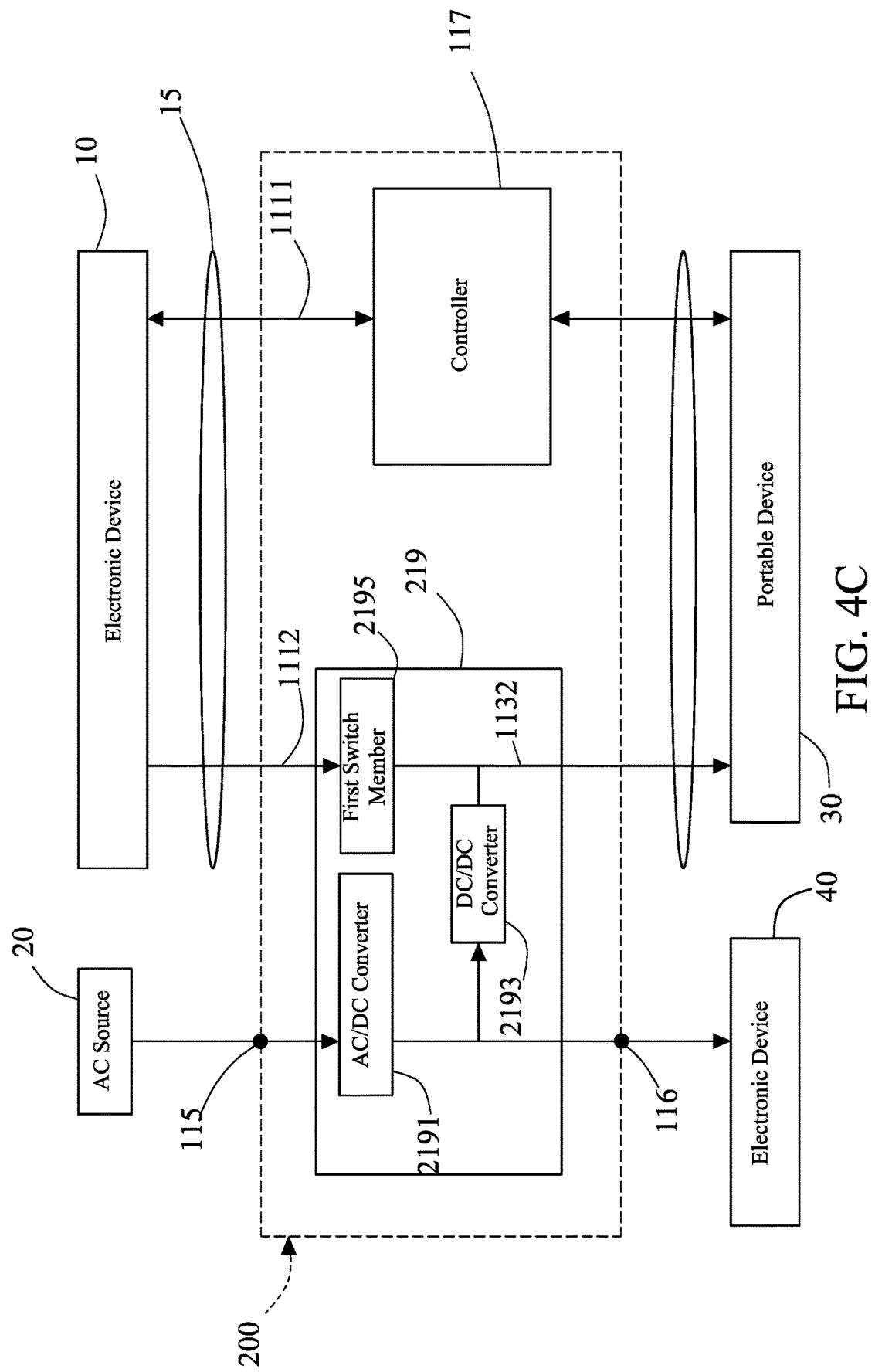
FIG. 4C is a schematic view of the framework of the hub in accordance with a fourth embodiment of the present invention.

Please refer to FIG. 3A, FIG. 3B, and FIG. 4C. FIG. 4C is a schematic view of the framework of the hub in accordance with a fourth embodiment of the present invention. In this embodiment, the power module 219 includes an AC/DC converter 2191, a DC/DC converter 2193, and a first switch member 2195. The fourth connector 116 is electrically connected with the electronic device 40. The third connector 115 is electrically connected with the AC source 20. The USB port 10a (as shown in FIG. 9A) of the electronic device 10 only provides the power supply mode. An input end of the AC/DC converter 2191 is electrically connected with the AC source 20 through the third connector 115. The output voltage V1 of the AC/DC converter 2191 can be as the input voltage of the electronic device 40. An input end of the DC/DC converter 2193 is electrically connected with the AC/DC converter 2191, and an output end of the DC/DC converter 2193 is electrically connected with the portable device 20. Besides, the first switch member 2195 is electrically connected between the first power line 1112 and the second power line 1132. In this embodiment, the first switch member 2195 is in a disconnection state. The electronic device 10 is not electrically connected with the portable device 20. The AC source 20 supplies power to the electronic device 40 and the portable device 20. In other embodiments, the fourth connector 116 is electrically connected with a DC source 40', and the third connector 115 is not electrically connected with the AC source 20 (as shown in FIG. 4B). The DC source 40' outputs its power to the portable device 20 through the DC/DC converter 2193.

Figure 4D:
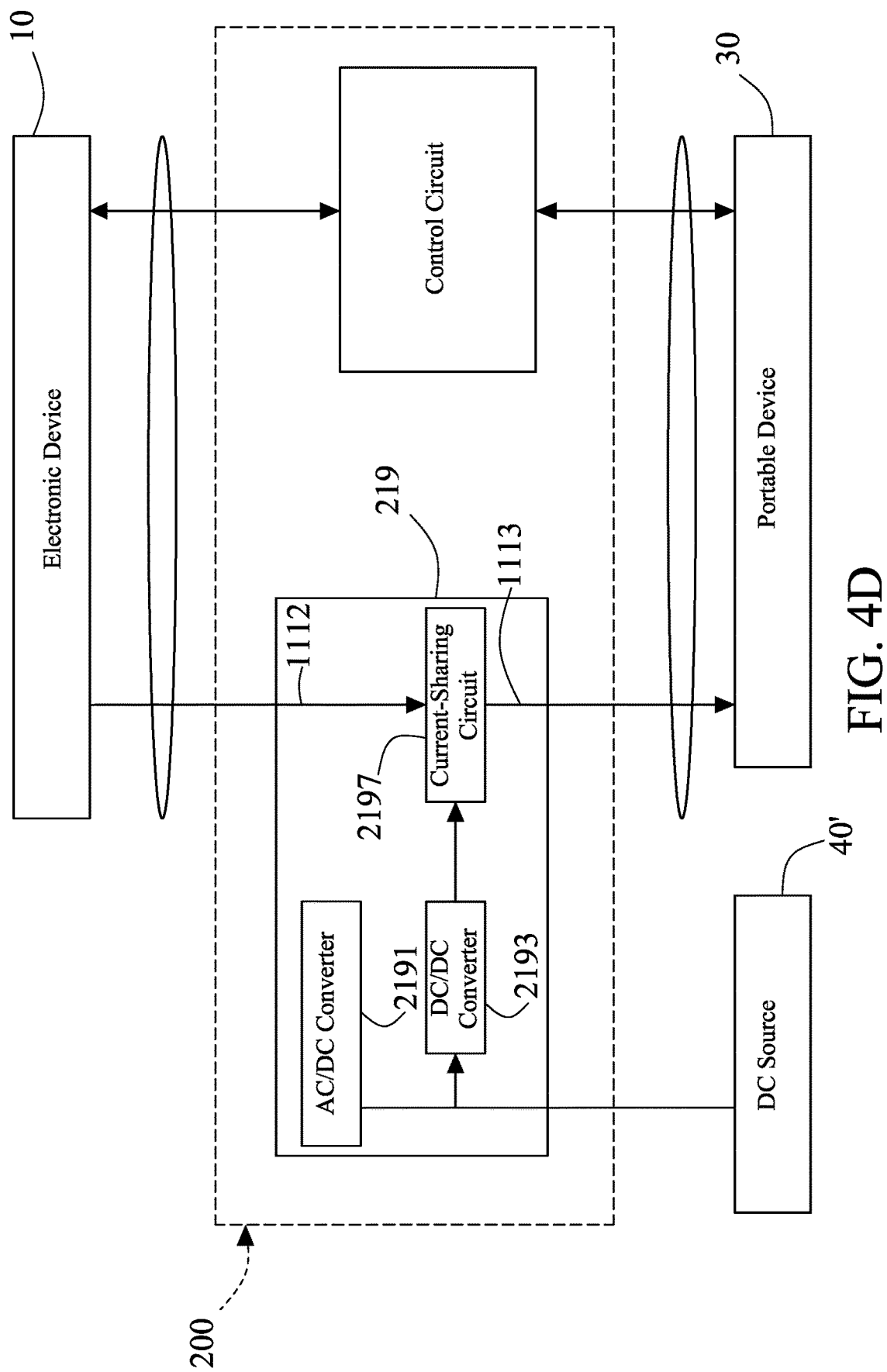
FIG. 4D is a schematic view of the framework of the hub in accordance with a fifth embodiment of the present invention.

Please refer to FIG. 4D. FIG. 4D is a schematic view of the framework of the hub in accordance with a fifth embodiment of the present invention. In this embodiment, the power module 219 includes an AC/DC converter 2191, a DC/DC converter 2193, and a current-sharing circuit 2197. The fourth connector 116 is electrically connected with the electronic device 40'. The third connector 115 is not electrically connected with the AC source 20. The USB port 10a (as shown in FIG. 9A) of the electronic device 10 only provides the power supply mode. The current-sharing circuit 2197 is electrically connected between the first power line 1112 and the second power line 1132. Through the current-sharing circuit 2197, the electronic device 10 and the DC source 40' will simultaneously supply power to the portable device 20. In this way, the portable device 20 won't stop running or lose transmission in case one of the electronic device 10 and the DC source 40' doesn't supply power. With the current-sharing circuit 2197, the priority and ratio of the power supply from the electronic device 10 and the DC source 40' can be set, such that the portable device 20 can utilize the maximum power source abundantly. Regarding the practice of the current-sharing circuit 2197, please refer to FIG. 4A and the related description of U.S. patent application Ser. No. 14/992,130.

Figure 5A:
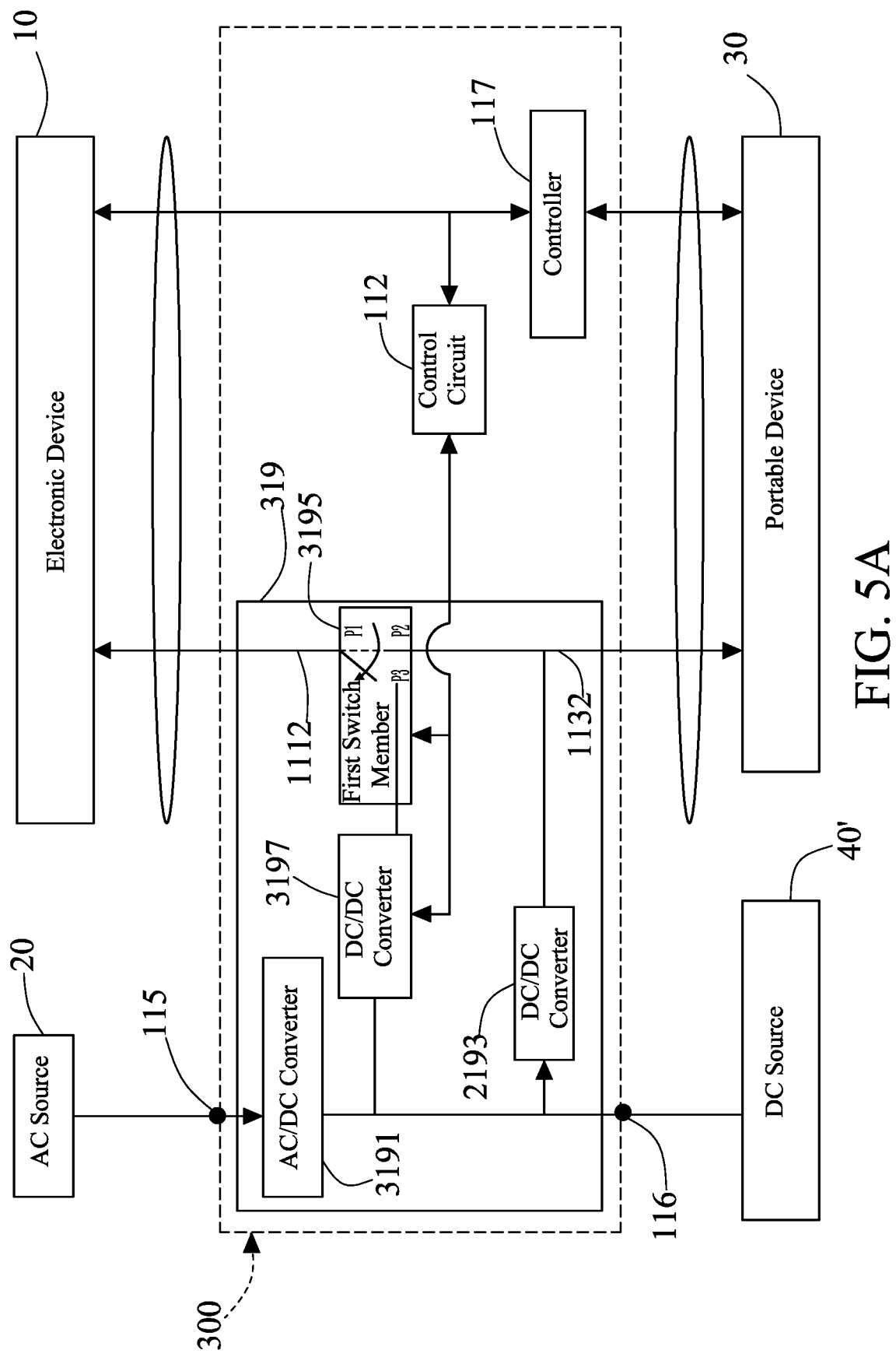
FIG. 5A is a schematic view of the framework of the hub in accordance with a sixth embodiment of the present invention.

FIG. 5A is a schematic view of the framework of the hub in accordance with a sixth embodiment of the present invention. In this embodiment, the power module 319 of a hub 300 includes an AC/DC converter 2191, a DC/DC converter 2193, a first switch member 3195, and a DC/DC converter 3197. The first switch member 3195 includes a first terminal P1, a second terminal P2, and a third terminal P3. The first terminal P1 is electrically connected with the first power line 1112. The second terminal P2 is electrically connected with the second power line 1132. An input end of the DC/DC converter 3197 is electrically connected with the AC/DC converter 2191. An output end of the DC/DC converter 3197 is electrically connected with the third terminal P3 of the first switch member 3195. The control circuit 112 is electrically connected with the first switch member 3195 and the DC/DC converter 3197. The control circuit 112 can adjust the output voltage of the DC/DC converter 3197. In this embodiment, the USB port 10a of the electronic device 10 provides the power supply mode and the charging mode. The DC/DC converter 3197 of this embodiment is a boost-buck converter. That is to say, the output voltage of the DC/DC converter 3197 can be less than the input voltage of the DC/DC converter 3197 or greater than the input voltage.

Referring to FIG. 5A, when the third connector 115 is electrically connected with the AC source 20 or the fourth connector 116 is electrically connected with the DC source 40', the first terminal P1 of the first switch member 3195 is connected with the third terminal P3. In detail, the required voltage of the electronic device 10 is assumed to be 15V. When the third connector 115 is electrically connected with the AC source 20 (but the fourth connector 116 is not electrically connected with the DC source 40') and if the output voltage of the AD/DC converter 2191 is 20V, the control circuit 112 will adjust the output voltage of the DC/DC converter 3197 to be 15V and supply the required power to the electronic device 10 through the first switch member 3195. That is to say, the DC/DC converter 3197 brings a buck function. When the fourth connector 116 is electrically connected with the DC source 40' (but the third connector 115 is not electrically connected with the AC source 20) and if the output voltage of DC source 40' is 12V, the control circuit 112 will adjust the output voltage of the DC/DC converter 3197 to be 15V. That is to say, the DC/DC converter 3197 brings a boost function. In other embodiments, the required voltage of the electronic device 10 is assumed to be 20V. When the third connector 115 is electrically connected with the AC source 20 (but the fourth connector 116 is not electrically connected with the DC source 40') and if the output voltage of the AD/DC converter 2191 is 20V, the control circuit 112 could be also provided with a switch circuit (not shown in the drawings) which is connected with the DC/DC converter 3197 in parallel and in a connection state for the DC/DC converter 3197 to supply the required power to the electronic device 10 through the first switch member 3195.

When the third connector 115 is not electrically connected with the AC source 20 and the fourth connector 116 is not electrically connected with the DC source 40', the first terminal P1 of the first switch member 3195 is connected with the second terminal P2. That is to say, both the AC source 20 and the DC source 40' are not electrically with the power module 319. The electronic device 10 supplies power to the portable device 20.

Figure 5B:
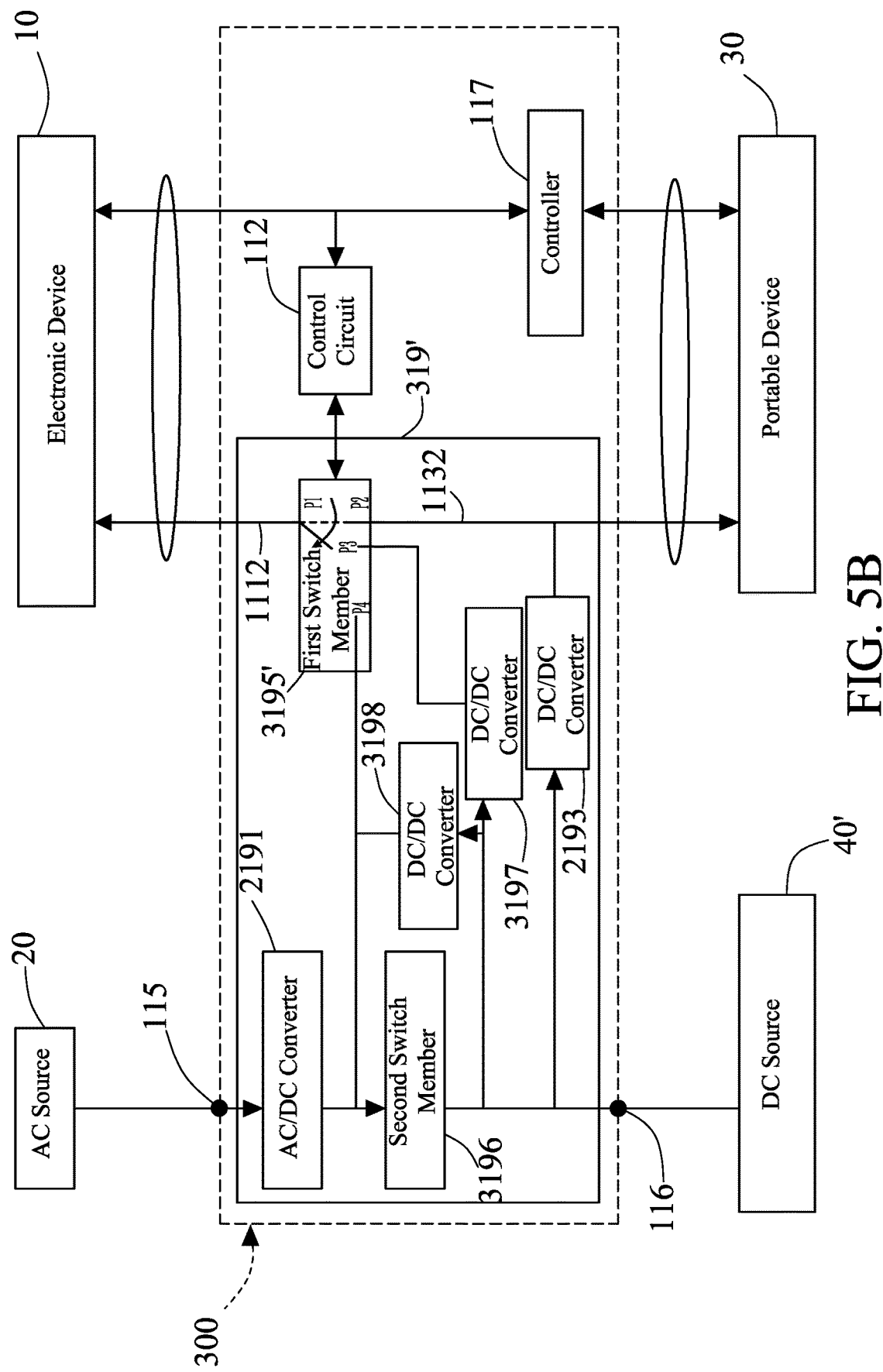
FIG. 5B is a schematic view of the framework of the hub in accordance with a seventh embodiment of the present invention.

FIG. 5B is a schematic view of the framework of the hub in accordance with a seventh embodiment of the present invention. In this embodiment, the power module 319' includes an AC/DC converter 2191, a DC/DC converter 2193, a first switch member 3195', a second switch member 3196, a DC/DC converter 3197, and a DC/DC converter 3198. The second switch member 3196 is electrically connected between the AC/DC converter 2191 and the fourth connector 116 for controlling the connection state of the AC/DC converter 2191 and the fourth connector 116. An input end of the DC/DC converter 2193 is electrically connected with the second switch member 3196. An output end of the DC/DC converter 2193 is electrically connected with the portable device 20. The first switch member 3195' includes a first terminal P1, a second terminal P2, a third terminal P3, and a fourth terminal P4. The first terminal P1 is electrically connected with the first power line 1112. The second terminal P2 is electrically connected with the second power line 1132. The fourth terminal P4 is electrically connected with the AC/DC converter 2191. The control circuit 112 is electrically connected with the first switch member 3195'. The control circuit 112 controls the first terminal P1 of the first switch member 3195' to be electrically connected with one of the second terminal P2, the third terminal P3, and the fourth terminal P4. An input end of the DC/DC converter 3197 is electrically connected with the second switch member 3196. An output end of the DC/DC converter 3197 is electrically connected with the third terminal P3 of the first switch member 3195'. An input end of the DC/DC converter 3198 is electrically connected with the second switch member 3196. An output end of the DC/DC converter 3198 is electrically connected with the fourth terminal P4 of the first switch member 3195'.

Referring to FIG. 5B, in this embodiment, the output voltage of the DC/DC converter 3198 is 20V, the output voltage of the DC/DC converter 3197 is 15V, and the output voltage of the DC/DC converter 2193 is 5V. The control circuit 112 controls the first terminal P1 to be electrically connected with one of the second terminal P2, the third terminal P3, and the fourth terminal P4 according to the data from the electronic device 10. When the required input voltage of the electronic device 10 is 20V, the first terminal P1 is electrically connected with the fourth terminal P4. When the required input voltage of the electronic device 10 is 15V, the first terminal P1 is electrically connected with the third terminal P3. When the third connector 115 is electrically connected with the AC source 20, the second switch member 3196 will be closed (namely, in a conduction state). The AC source 20 supplies power to the electronic device 10 and the portable device 20, even the electronic device 40 (if the fourth connector 116 is electrically connected with the electronic device 40). When the fourth connector 116 is electrically connected with the DC source 40', the second switch member 3196 will be in a disconnection state and the DC source 40' supplies power to the electronic device 10 and the portable device 30. When the third connector 115 is not electrically connected with the AC source 20 and the fourth connector 116 is not electrically connected with the DC source 40', the first terminal P1 of the first switch member 3195' is connected with the second terminal P2 and the electronic device 10 supplies power to the portable device 20. As shown in FIG. 5B, the output voltage of the DC/DC converter 3197 is a fixed voltage, but the output voltage of the DC/DC converter 3197 may be adjustable. For example, it can be adjusted to 9V or 12V.

Figure 6:
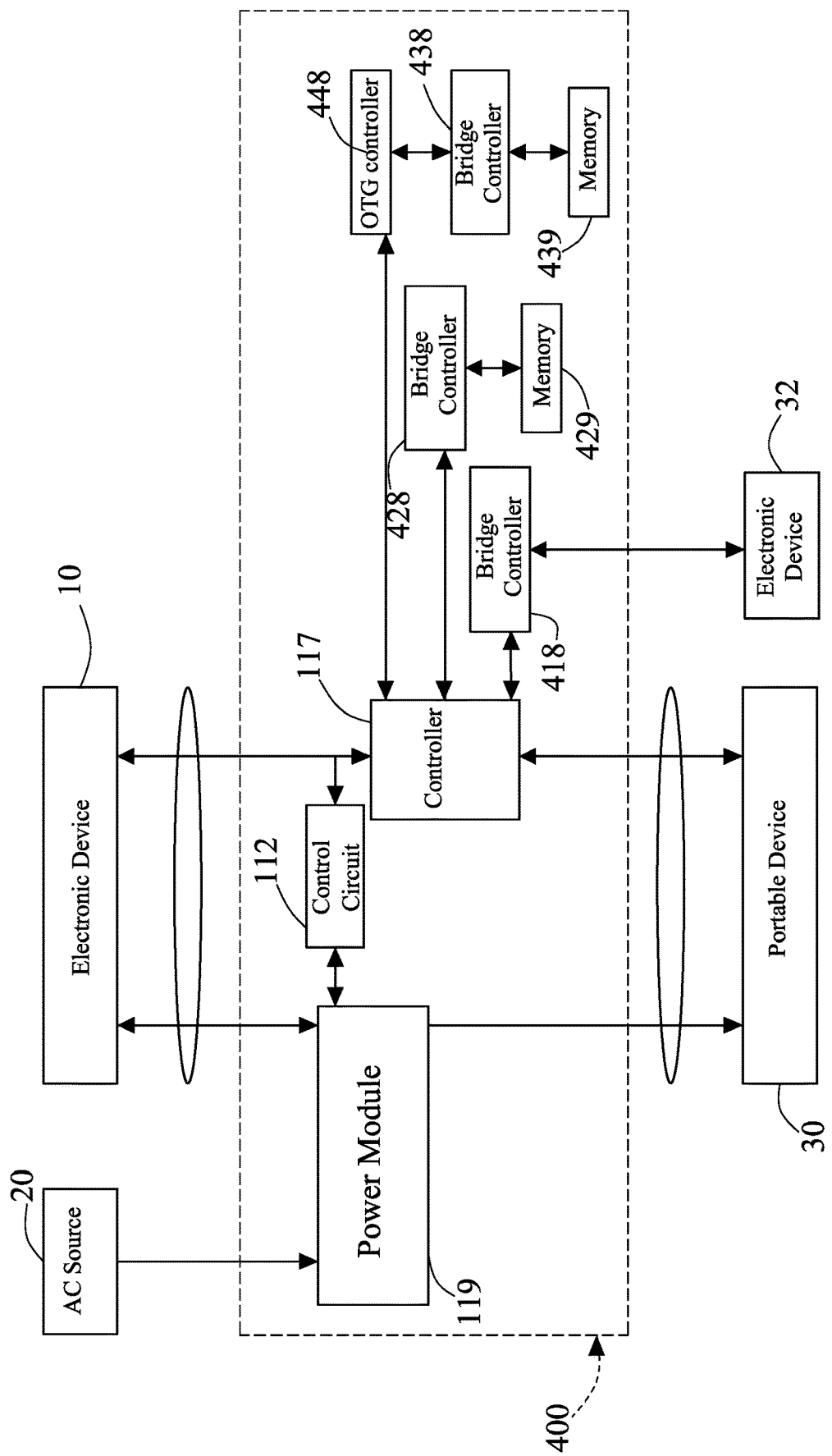
FIG. 6 is a schematic view of the framework of the hub in accordance with an eighth embodiment of the present invention.

FIG. 6 is a schematic view of the framework of the hub in accordance with an eighth embodiment of the present invention. Compared to the hub 100 of FIG. 2A, the hub 400 of this embodiment includes a plurality of bridge controllers 418, 428, 438. The bridge controllers 418, 428, 438 are electrically connected with the controller 117. The bridge controllers 418, 428, 438 are adapted for transformation of signals in different formats. For example, the bridge controller 418 is able to transform the output signal of the controller 117 into another signal in a different format, and then the signal is transmitted to an external electronic device 32, such as a card reader, a VGA port, or an HDMI port. The bridge controller 428 is connected with a memory 429. The memory 429 is disposed in the hub 400, such that the hub 400 provides a data storage function as a portable hard disk. The hub 400 further includes an OTG (On-The-Go) controller 448. The OTG controller 448 is electrically connected with the controller 117. The bridge controller 438 is electrically connected between the OTG controller 448 and a memory 439. The OTG controller 448 is to support the standard of USB On-The-Go. Thus, the memory 439 and the portable device 20 can perform data transmission directly, without the other computer apparatus.

Figure 7:
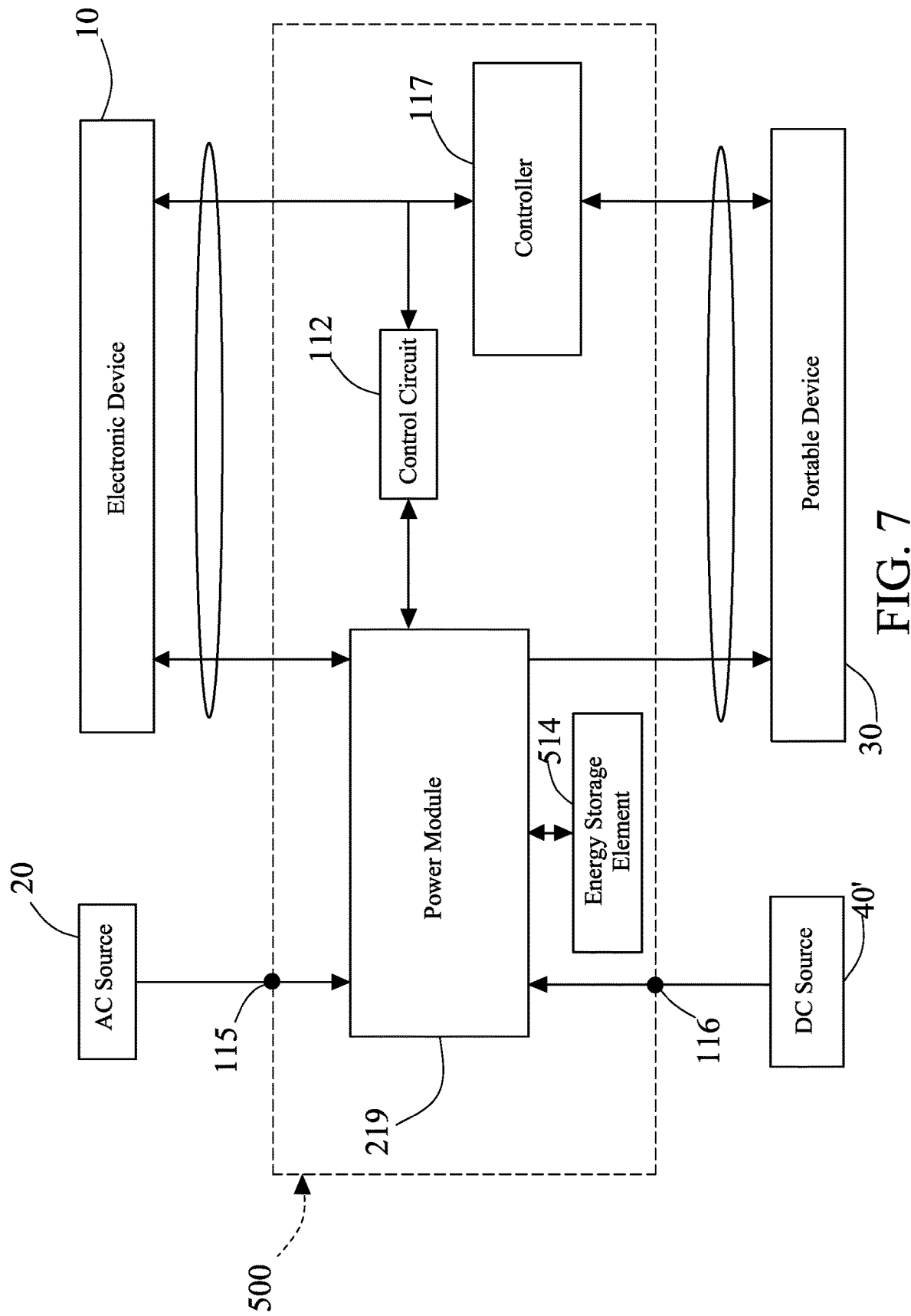
FIG. 7 is a schematic view of the framework of the hub in accordance with a ninth embodiment of the present invention.

FIG. 7 is a schematic view of the framework of the hub in accordance with a ninth embodiment of the present invention. Compared to the hub 200 of FIG. 4B, the hub 500 of this embodiment further includes an energy storage element 514. The energy storage element 514 is electrically connected with the power module 219. When the third connector 115 is electrically connected with the AC source 20 and the fourth connector 116 is electrically connected with the DC source 40', the energy storage element 514 is in the charging mode. On the contrary, when the third connector 115 is not electrically connected with the AC source 20 and the fourth connector 116 is not electrically connected with the DC source 40', the energy storage element 514 is in the power supply mode. The hub 500 of this embodiment can be used as a power bank. In this embodiment, the energy storage element 514 is located outside the power module 219, but the energy storage element 514 may be disposed in the power module 219. In this embodiment, the energy storage element 514 may be a battery or a capacitor.

Figure 8:
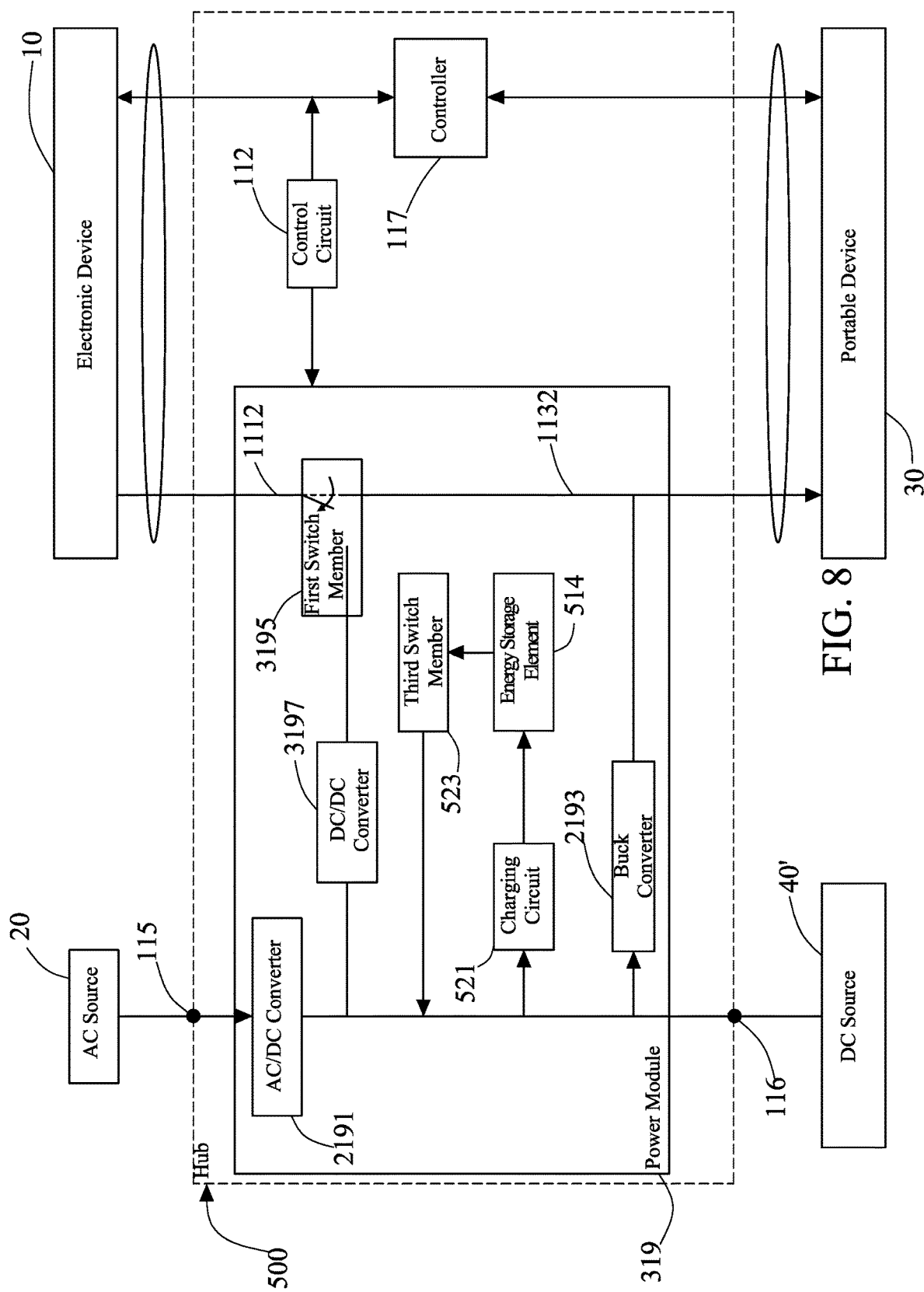
FIG. 8 is a schematic view of the framework of the hub in accordance with a tenth embodiment of the present invention.

FIG. 8 is a schematic view of the framework of the hub in accordance with a tenth embodiment of the present invention. In this embodiment, the hub 500' further includes an energy storage element 514, a charging circuit 521, and a third switch member 523. An input end of the charging circuit 521 is electrically connected with the AC/DC converter 2191, and an output end of the charging circuit 521 is electrically connected with the energy storage element 514. An input end of third switch member 523 is electrically connected with the energy storage element 514, and an output end of third switch member 523 is electrically connected with the DC/DC converter 3197 and the DC/DC converter 2193. When the third connector 115 is electrically connected with the AC source 20 or the fourth connector 116 is electrically connected with the DC source 40', the third switch member 523 is disconnected and the charging circuit 521 is to charge the energy storage element 514. When the third connector 115 is not electrically connected with the AC source 20 and the fourth connector 116 is not electrically connected with the DC source 40', the third switch member 523 is connected for the energy storage element 514 to be in the power supply mode. The energy storage element 514 supplies power to the portable device 20 through the DC/DC converter 2193, and supplies power to the electronic device 10 through the DC/DC converter 3197.

Figure 10:
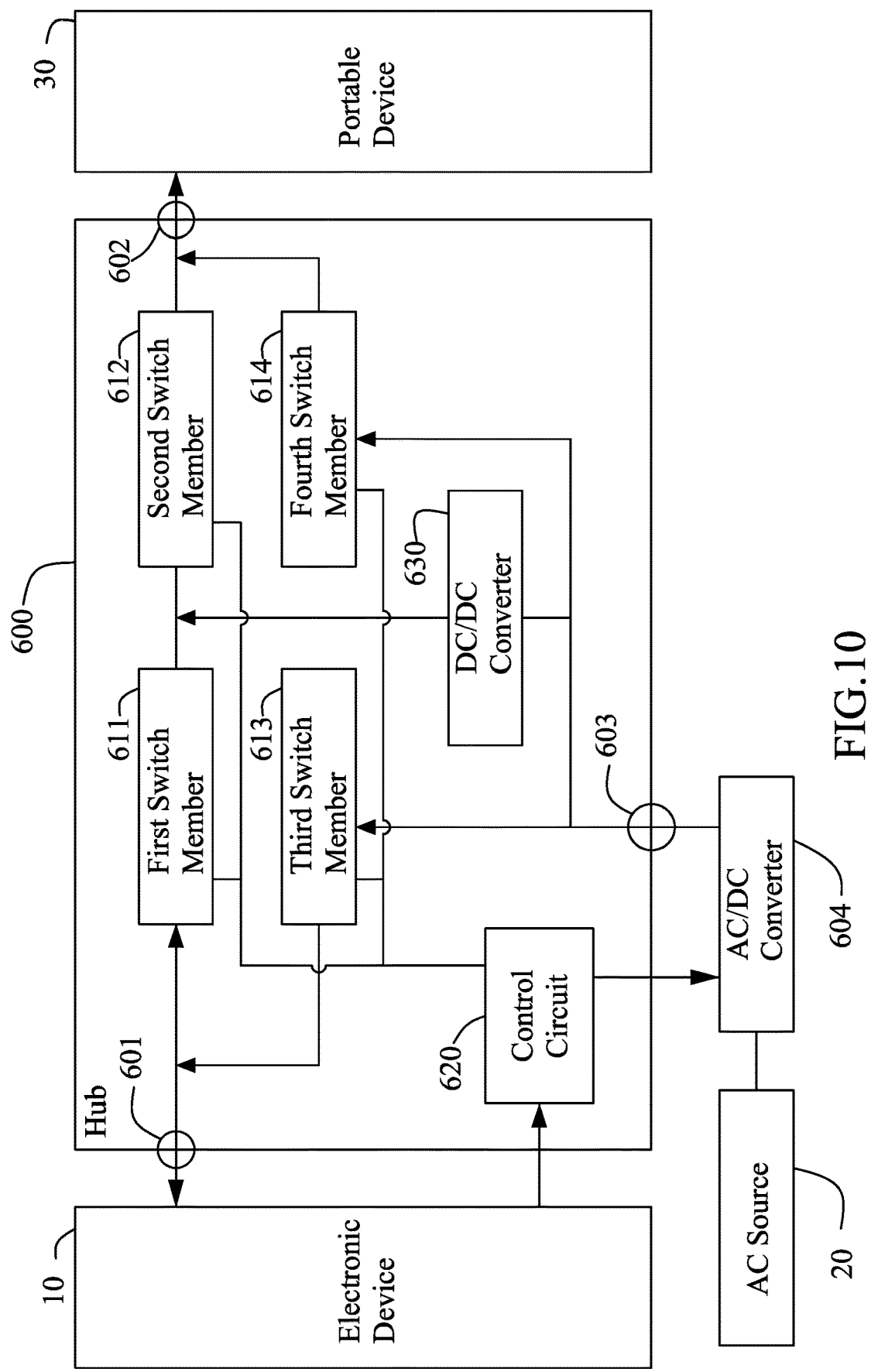
FIG. 10 is a schematic view of the framework of the hub in accordance with an eleventh embodiment of the present invention.

Referring to FIG. 10. FIG. 10 is a schematic view of the framework of the hub in accordance with an eleventh embodiment of the present invention. The hub 600 of the eleventh embodiment is configured to electrically connected with an electronic device 10, an AC source 20, and at least one portable device 30 in the outside environment. The hub 600 includes a first connector 601, at least one second connector 602, a third connector 603, an AC/DC converter 604, a first switch member 611, a second switch member 612, a third switch member 613, a fourth switch member 614, a control circuit 620 and a DC/DC converter 630.

The first connector 601 is a port which connects the hub 600 and the electronic device 10. In this embodiment, the first connector 601 is a USB-C (Type-C Universal Serial Bus) port, and the first connector 601 is electrically connected with the electronic device 10 via a wire. The electronic device 10 is such as a notebook or a desktop computer. The second connector 602 is connected with the portable device 30. The portable device 30 is a smart phone or tablet computer (e.g. iPad). The second connector 602 is a USB-A (Type-A Universal Serial Bus) port.

The third connector 603 is configured to electrically connect to AC source 20. The DC/AC converter 604 is electrically connected with the third connector 603. The DC/AC converter 604 is configured to convert the AC power of the AC source 20 into DC power. The DC/AC converter 604 is further configured to convert 110V or 220V AC from AC source 20 into 5.3-20V DC which suitable for the portable device 30. Besides, the DC/AC converter 604 is integrated into the hub 600 or such as an adapter disposed outside the hub 600. If the DC/AC converter 604 is disposed outside the hub 600, the DC/AC converter 604 is electrically connected between the AC source 20 and the third connector 603.

One end of the first switch member 611 is electrically connected with the first connector 601 and another end is electrically connected with the second switch member 612. One end of the second switch member 612 is electrically connected with the first switch member 611 and another end is electrically connected with the second connector 602. One end of the third switch member 613 is electrically connected with the first connector 601 and another end is electrically connected with the third connector 603. One end of the fourth switch member 614 is electrically connected with the third connector 603 and another end is electrically connected with the second connector 602. In this embodiment the first switch member 611, the second switch member 612, the third switch member 613 and the fourth switch member 614 are the switch members which are configured to be switched between turn-off and turn-on. One end of the DC/DC converter 630 is electrically connected with the third connector 603 and another end is electrically connected between the first switch member 611 and the second switch member 612. The DC/DC converter 630 is such as a buck converter and has 5V output voltage. The 5V is appropriate charge voltage for the portable device 30.

The control circuit 620 is electrically connected with the first switch member 611, the second switch member 612, the third switch member 613, the fourth switch member 614 and the AC/DC converter 604. Therefore, the control circuit 620 would control the turn-on or turn-off status of the first switch member 611, the second switch member 612, the third switch member 613, the fourth switch member 614 and the DC/DC converter 630 based on the connection status of the first connector 601, the second connector 602, the third connector 603, the electronic device 10 and the portable device 30. The control circuit 620 can turn on or turn off the first switch member 611, the second switch member 612, the third switch member 613 and the fourth switch member 614. Besides, the control circuit 620 further controls the AC/DC converter 604 to output appropriate voltage.

The control methods of control circuit 620 are shown as following:

1. When the third connector 603 is not electrically connected with AC source 20, the control circuit 620 turns on the first switch member 611 and the second switch member 612 and turns off the third switch member 613 and the fourth switch member 614. Thus, the electronic device 10 would charge the portable device 30 via the first switch member 611 and the second switch member 612. In other words, the power will be delivered from the electronic device 10 to the portable device 30 via the first switch member 611 and the second switch member 612.

2. When the second connector 602 is not electrically connected with the portable device 30 and the third connector 603 is electrically connected with the AC source 20, the control circuit 620 turns off the first switch member 611, the second switch member 612 and the fourth switch member 614 and turns on the third switch member 613. The control circuit 620 further controls the AC/DC converter 604 to output an appropriate voltage for the electronic device 10. Thus, the AC source 20 would charge the electronic device 10 via the AC/DC converter 604 and the third switch member 613. In other words, the power will be delivered from the AC source 20 to the electronic device 10 via the AC/DC converter 604 and the third switch member 613.

3. When the third connector 603 is electrically connected with the AC source 20 and the electronic device 10 is also electrically connected with the hub 600, the control circuit 620 turns on the second switch member 612 and the third switch member 613 and turns off the first switch member 611 and the fourth switch member 614. The control circuit 620 further controls the AC/DC converter 604 to output appropriate voltage for the electronic device 10. Thus, the AC source 20 would charge the electronic device 10 via the AC/DC converter 604 and the third switch member 613. The AC source 20 would charge the portable device 30 via the AC/DC converter 604, DC/DC converter 630 and the second switch 612. The DC/DC converter 630 would convert the output voltage of the AC/DC converter 604 into an appropriate voltage for the portable device 30. In other words, the power will be delivered from the AC source 20 to the portable device 30 via the AC/DC converter 604, the DC/DC converter 630 and the second switch 612, and to the electronic device 10 via the AC/DC converter 604 and the third switch member 613.

4. When the portable device 30 and the electronic device 10 have same charging voltage, the control circuit 620 turns on the third switch member 613 and the fourth switch member 614 and turns off the first switch member 611 and the second switch member 612. The control circuit 620 further controls the AC/DC converter 604 to output appropriate voltage for the electronic device 10 and the portable device 30. Thus, the AC source 20 charges the portable device 30 and the electronic device 10 via the AC/DC converter 604, the third switch member 613 and the fourth switch member 614. In other words, the power will be delivered from the AC source 20 to the portable device 30 and the electronic device 10 via the AC/DC converter 604, the third switch member 613 and the fourth switch member 614.

5. When the first connector 601 is not electrically connected with the electronic device 10 and the second connector 602 is electrically connected with the portable device 30, the control circuit 620 turns on the fourth switch member 614 and turns off the first switch member 611, the second switch member 612 and the third switch member 613. The control circuit 620 further controls the AC/DC converter 604 to output appropriate voltage for the portable device 30. Thus, the AC source 20 would charge the portable device 30 via the AC/DC converter 604, and the fourth switch member 614. In other words, the power will be delivered from the AC source 20 to the portable device 30 via the AC/DC converter 604 and the fourth switch member 614.

Figure 11:
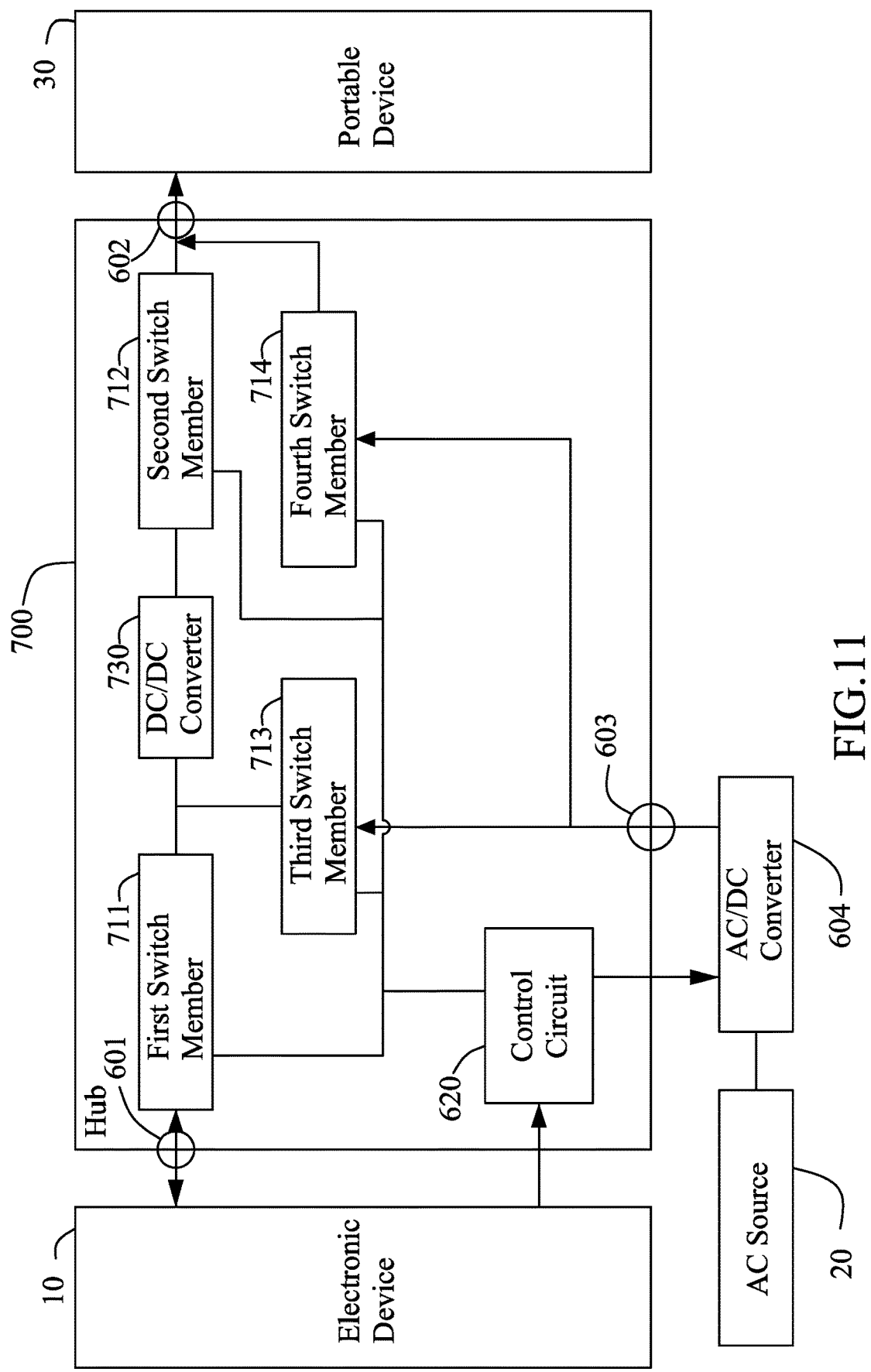
FIG. 11 is a schematic view of the framework of the hub in accordance with a twelfth embodiment of the present invention.

Referring to FIG. 11. The FIG. 11 is a schematic view of the framework of the hub in accordance with a twelfth embodiment of the present invention. The hub 700 of the twelfth embodiment is configured to electrically connected with an electronic device 10, an AC source 20, and at least one portable device 30 in the outside environment. The hub 700 includes a first connector 601, at least one second connector 602, third connector 603, an AC/DC converter 604, a first switch member 711, a second switch member 712, a third switch member 713, a fourth switch member 714, a control circuit 620 and a DC/DC converter 730. The first connector 601, the second connector 602, the third connector 603 and the AC/DC converter 604, are the same as above eleventh embodiment. Thus, they would not be explanted again in this embodiment.

In the twelfth embodiment, one end of the first switch member 711 is electrically connected with the first connector 601 and another end is electrically connected with the second switch member 712. One end of the second switch member 712 is electrically connected with the first switch member 711 and another end is electrically connected with the second connector 602. One end of the third switch member 713 is connected between the first switch member 711 and the second switch member 712 and another end is electrically connected with the third connector 603. One end of the fourth switch member 714 is electrically connected with the third connector 603 and another is electrically connected with the second connector 602. The DC/DC converter 730 can boost the output voltage of the electronic device 10 into 5V DC or can buck output voltage of the AC source 20 into 5V DC. The 5V DC is appropriate charge voltage for the portable device 30.

The control circuit 620 is electrically connected with the first switch member 711, the second switch member 712, the third switch member 713, the fourth switch member 714 and the AC/DC converter 604. Therefore, the control circuit 620 would control the turn-on or turn-off status of the first switch member 711, the second switch member 712, the third switch member 713, the fourth switch member 714 and the AC/DC converter 604 based on the connection status of the first connector 601, the second connector 602, the third connector 603, the electronic device 10 and the portable device 30.

The control methods of control circuit 620 are shown as following:

1. When the third connector 603 is not electrically connected with AC source 20, the control circuit 620 turns on the first switch member 711 to and the second switch member 712 and turns off the third switch member 713 to and the fourth switch member 714. Thus, the electronic device 10 would charge the portable device 30 via the first switch member 711, the second switch member 712 and the DC/DC converter 730. The DC/DC converter 730 converts the output voltage of the electronic device 10 into an appropriate voltage for the portable device 30. In other word, the power will be delivered from the electronic device 10 to the portable device 30 via the first switch member 711, the DC/DC converter 730 and the second switch member 712.

2. When the second connector 602 is not electrically connected with the portable device 30 and the third connector 603 is electrically connected with the AC source 20, the control circuit 620 turns on the first switch member 711 and the third switch member 713 and turns off the second switch member 712 and the fourth switch member 714. The control circuit 620 further control the AC/DC converter 604 to output appropriate voltage for the electronic device 10. Thus, the AC source 20 would charge the electronic device 10 via the AC/DC converter 604, the third switch member 713 and the first switch member 711. In other words, the power will be delivered from the AC source 20 to the electronic device 10 via the AC/DC converter 604, the third switch member 713 and the first switch member 711.

3. When the third connector 603 is electrically connected with the AC source 20 and the electronic device 10 is also connected with the hub 700, the control circuit 620 turns on the first switch member 711, the second switch member 712 and third switch member 713 and turns off the fourth switch member 714. The control circuit 620 further control the AC/DC converter 604 to output appropriate voltage for the electronic device 10. Thus, the AC source 20 would charge the electronic device 10 via the AC/DC converter 604, the third switch member 713 and the first switch member 711. The AC source 20 would charge the portable device 30 via the AC/DC converter 604, the third switch member 713, the DC/DC converter 730 and the second switch member 712. The DC/DC converter 730 would converts the output voltage of AC/DC converter 604 into an appropriate voltage for the portable device 30. In other words, the power will be delivered from the AC source 20 to the electronic device 10 via the AC/DC converter 604, the third switch member 713, the DC/DC converter 730 and the second switch member 712, and to the portable device 30 via the AC/DC converter 604, the third switch member 713, the DC/DC converter 730 and the second switch member 712.

4. When the portable device 30 and the electronic device 10 have same charging voltage, the control circuit 620 turns on the first switch member 711, the third switch member 713 and the fourth switch member 714 and turns off the second switch member 712. Thus, the AC source 20 would charge the portable device 30 and the electronic device 10 via the AC/DC converter 604, the first switch member 711, the third switch member 713 and the fourth switch member 714. In other words, the power will be delivered from the AC source 20 to the portable device 30 and the electronic device 10 via the AC/DC converter 604, the first switch member 711, the third switch member 713 and the fourth switch member 714.

5. When the first connector 601 is not electrically connected with the electronic device 10 and the second connector 602 is electrically connected with the portable device 30, the control circuit 620 turns on the fourth switch member 714 and turns off the first switch member 711, the second switch member 712 and the third switch member 713. The control circuit 620 further control the AC/DC converter 604 to output appropriate voltage for the portable device 30. Thus, the AC source 20 would charge the portable device 30 via the AC/DC converter 604 and the fourth switch member 714. In other words, the power will be delivered from the AC source 20 to the portable device 30 via the AC/DC converter 604 and the fourth switch member 714.

Figure 9B:
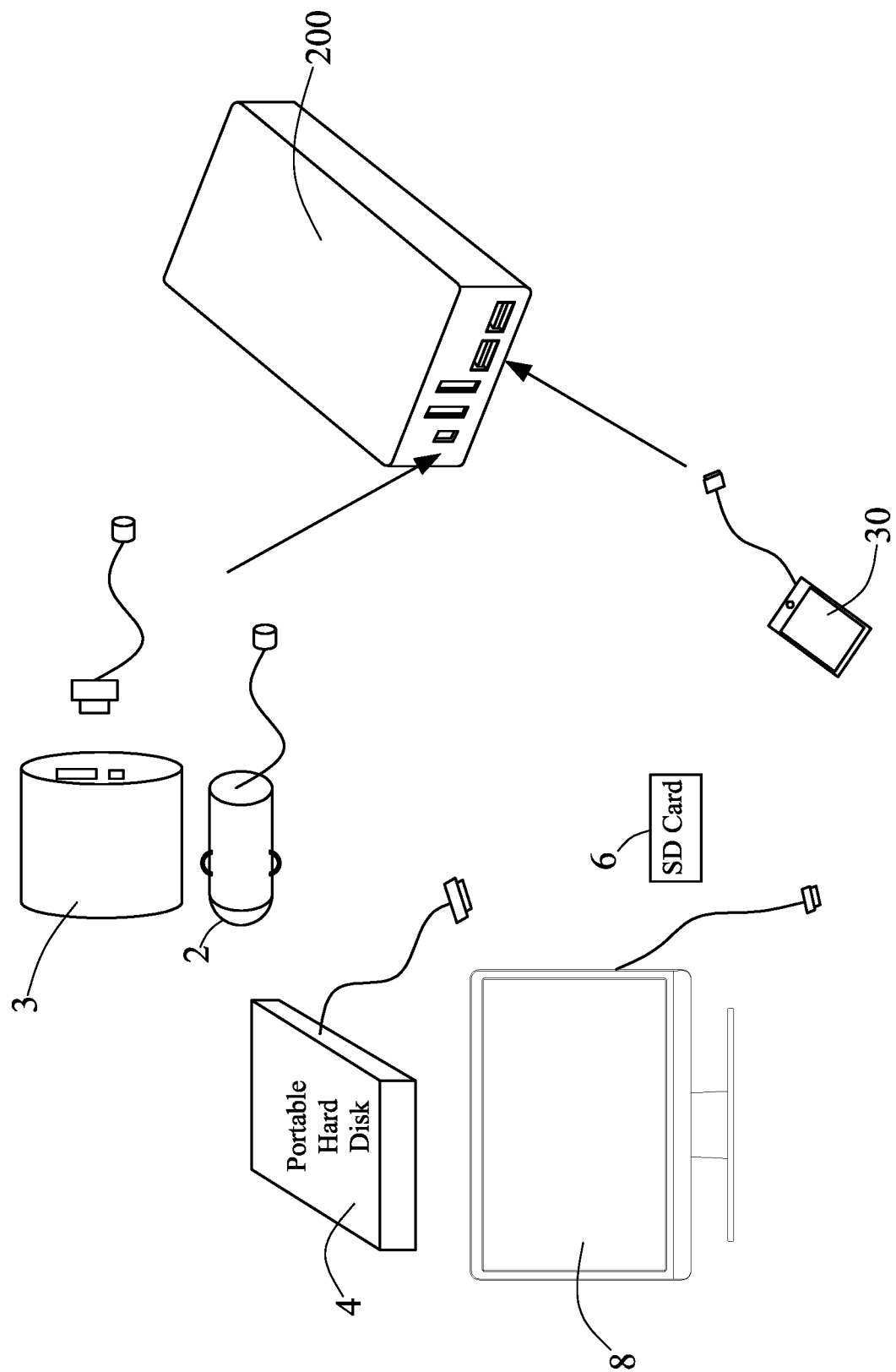

FIG. 9A and FIG. 9B are schematic views of the hub of the present invention in practical use. The hub hereto is the hub 200 of the third embodiment. The electronic device 10 is a notebook. Through the hub 200, the electronic device 10 needs only a USB 3.1 PD (Power Delivery) type C port 10a to connect a TV 8, a portable device 30, a SD card 6, and a portable hard disk 4 for signal communication; or the hub 200 may supply power to the TV 8, the portable device 30, and the portable hard disk 4; or the hub 200 may supply the power from the AC source 20 to the electronic device 10 or the other devices; or the hub 200 converts the power source (namely, the DC source 40') of a car or an airplane into the required power of the portable devices, a notebook, or the like through a car-cigarette 2; or the hub 200 is used to supply the required power of various equipment through the power bank 3 to be electrically connected with the fourth connector 116. Thereby, the number and type of the USB ports of the hub 200 and the electronic device 10 can be decreased and standardized. Thus, the type and specification of the hub 200 also can be standardized. Consumers have various choices and combinations of the electronic device 10 and the hub 200, so it is more flexible, cheaper and more convenient for purchase.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A hub, electrically connected with an electronic device, an alternating current (AC), and at least one portable device, the hub comprising:
   a first connector electrically connected with the electronic device, the first connector being a Universal Serial Bus Type-C (USB-C) port;
   at least one second connector electrically connected with the portable device;
   a third connector electrically connected with the alternating current (AC) source via an alternating current to direct current (AC/DC) converter;
   a first switch member wherein one end of the first switch member is electrically connected with the first connector;
   a second switch member wherein one end of the second switch member is electrically connected with the first switch member and another end of the second switch member is electrically connected with the second connector;
   a third switch member wherein one end of the third switch member is electrically connected with the first connector and another end of the third switch member is electrically connected with the alternating current to direct current (AC/DC) converter;
   a fourth switch member wherein one end of the fourth switch member is electrically connected with the second connector and another end of the fourth switch member is electrically connected with the alternating current to direct current (AC/DC) converter;
   a direct current to direct current (DC/DC) converter wherein one end of the direct current to direct current (DC/DC) converter is electrically connected with the third connector and another end of the direct current to direct current (DC/DC) converter is electrically connected between the first switch member and the second switch member; and
   a control circuit electrically connected with the first switch member, the second switch member, the third switch member, the fourth switch member and the alternating current to direct current (AC/DC) converter, the control circuit configured to control the first switch member, the second switch member, the third switch member, the fourth switch member and the alternating current to direct current (AC/DC) converter.

2. A hub, electrically connected with an electronic device, an alternating current (AC) source, and at least one portable device, the hub comprising:

a first connector electrically connected with the electronic device, the first connector being a Universal Serial Bus Type-C (USB-C) port;

at least one second connector electrically connected with the portable device;

a third connector electrically connected with the alternating current (AC) source via an alternating current to direct current (AC/DC) converter;

a first switch member wherein one end of the first switch member is electrically connected with the first connector;

a second switch member wherein one end of the second switch member is electrically connected with the first switch member and another end of the second switch member is electrically connected with the second connector;

a third switch member wherein one end of the third switch member is electrically connected between the first switch member and the second switch member and another end of the third switch member is electrically connected with the alternating current to direct current (AC/DC) converter;

a fourth switch member wherein one end of the fourth switch member is electrically connected with the alternating current to direct current (AC/DC) converter and another end of the fourth switch member is electrically connected with the second connector;

a direct current to direct current (DC/DC) converter electrically connected between the first switch member and the second switch member; and a control circuit electrically connected with the first switch member, the second switch member, the third switch member, the fourth switch member and the alternating current to direct current (AC/DC) converter, the control circuit configured to control the first switch member, the second switch member, the third switch member, the fourth switch member and the alternating current to direct current (AC/DC) converter.

3. A hub electrically connected with an electronic device, an AC source, an alternating current to direct current (AC/DC) converter, and at least one portable device, the hub electrically connected with the alternating current (AC) source via the alternating current to direct current (AC/DC) converter, the hub comprising:

a first connector electrically connected with the electronic device, the first connector being a Universal Serial Bus Type-C (USB-C) port;

at least one second connector electrically connected with the portable device;

a third connector electrically connected with the alternating current to direct current (AC/DC) converter;

a first switch member wherein one end of the first switch member is electrically connected with the first connector;

a second switch member wherein one end of the second switch member is electrically connected with the first switch member and another end of the second switch member is electrically connected with the second connector;

a third switch member wherein one end of the third switch member is electrically connected between the first switch member and the second switch member and another end of the third switch member is electrically connected with the third connector;

a fourth switch member wherein one end of the fourth switch member is electrically connected with the third connector and another end of the fourth switch member is electrically connected with the second connector;

a direct current to direct current (DC/DC) converter electrically connected between the first switch member and the second switch member; and a control circuit electrically connected with the first switch member, the second switch member, the third switch member, the fourth switch member and the alternating current to direct current (AC/DC) converter, the control circuit configured to control the first switch member, the second switch member, the third switch member, the fourth switch member and the alternating current to direct current (AC/DC) converter.

\* \* \* \* \*